United States Patent
Wei et al.

(10) Patent No.: US 12,015,482 B2
(45) Date of Patent: *Jun. 18, 2024

(54) CONFIGURATION OF ULTRA RELIABLE LOW LATENCY COMMUNICATION

(71) Applicant: FG Innovation Company Limited, New Territories (CN)

(72) Inventors: Chia-Hung Wei, Hsinchu (TW); Chie-Ming Chou, Hsinchu (TW); Hung-Chen Chen, Taipei (TW)

(73) Assignee: FG Innovation Company Limited, Tuen Mun (HK)

( * ) Notice: Subject to any disclaimer, the term of this patent is extended or adjusted under 35 U.S.C. 154(b) by 366 days.

This patent is subject to a terminal disclaimer.

(21) Appl. No.: 17/461,054

(22) Filed: Aug. 30, 2021

(65) Prior Publication Data

US 2021/0391942 A1 Dec. 16, 2021

Related U.S. Application Data

(63) Continuation of application No. 16/436,638, filed on Jun. 10, 2019, now Pat. No. 11,133,896.

(Continued)

(51) Int. Cl.
*H04L 1/00* (2006.01)
*H04W 72/1273* (2023.01)
(Continued)

(52) U.S. Cl.
CPC ............ *H04L 1/007* (2013.01); *H04L 1/0061* (2013.01); *H04W 72/1273* (2013.01); *H04W 72/23* (2023.01); *H04W 76/11* (2018.02)

(58) Field of Classification Search
CPC ...... H04L 1/007; H04L 1/0061; H04W 76/11; H04W 72/1273; H04W 72/23
See application file for complete search history.

(56) References Cited

U.S. PATENT DOCUMENTS 11,133,896 B2 * 9/2021 Wei ..................... H04L 1/0061
2014/0192775 A1 7/2014 Li et al.
(Continued)

FOREIGN PATENT DOCUMENTS

CN 101610579 A 12/2009
CN 106031067 A 10/2016
(Continued)

OTHER PUBLICATIONS

Ericsson; TP related email discussion #23 for 38.331 ASN.1 review part 5 3GPP TSG-RAN WG2 Meeting #101 R2-1803773; Mar. 2, 2018.

(Continued)

*Primary Examiner* — Brenda H Pham
(74) *Attorney, Agent, or Firm* — ScienBiziP, P.C.

(57) ABSTRACT

Methods, apparatuses, and computer-readable media are described for configuring Ultra Reliable Low Latency Communication (URLLC) simultaneous transmissions, which can be used to enhance network performance and/or to enhance procedures within the UE to achieve more efficient operations. For example, techniques are described for determining which modulation coding scheme (MCS) table to apply based on various factors. Different techniques are also described for configuring user equipment (UE) with an RNTI based on different considerations.

12 Claims, 30 Drawing Sheets

Related U.S. Application Data

(60) Provisional application No. 62/685,368, filed on Jun. 15, 2018.

(51) Int. Cl.
*H04W 72/23* (2023.01)
*H04W 76/11* (2018.01)

(56) References Cited

U.S. PATENT DOCUMENTS

| | | | |
|---|---|---|---|
| 2014/0286243 A1 | 9/2014 | Yamada | |
| 2017/0279567 A1* | 9/2017 | Rahman | H04L 5/001 |
| 2017/0303306 A1 | 10/2017 | Lee et al. | |
| 2018/0199245 A1 | 7/2018 | Futaki et al. | |
| 2019/0215095 A1 | 7/2019 | Park | |
| 2019/0342936 A1 | 11/2019 | Wu | |
| 2020/0204289 A1* | 6/2020 | Yoshimoto | H04L 1/0025 |
| 2020/0287654 A1 | 9/2020 | Xi et al. | |

FOREIGN PATENT DOCUMENTS

| | | |
|---|---|---|
| CN | 107852658 A | 3/2018 |
| WO | 2017022167 A1 | 2/2017 |
| WO | 2019215876 A1 | 11/2019 |

OTHER PUBLICATIONS

International Search Report dated Aug. 28, 2019 in International Application PCT/CN2019/089385.
Office Action dated Dec. 7, 2020 in U.S. Appl. No. 16/436,638.
Notice of Allowance dated Jun. 1, 2021 in U.S. Appl. No. 16/436,638.
Ericsson, "Offline Discussion on Support of Separate CQI and MCS table(s) for URLLC", R1-1807748, 3GPP TSG RAN WG1 Meeting #93, Busan, Korea, May 21-25, 2018.
MCC Support, "Draft Report of 3GPP TSG RAN WG1 #93 v0.1.0 (Busan, South Korea, May 21-25, 2018)", R1-180xxxx, 3GPP TSG RAN WG1 Meeting #94, Gothenburg, Sweden, Aug. 20-24, 2018.
Ericsson, "[Draft] LS on RRC Parameters for NR URLLC", R1-1807822, 3GPP TSG RAN WG1 Meeting#93, Busan, Korea, May 21-25, 2018.
3GPP TS 38.331 V15.1.0 (Mar. 2018), 3rd Generation Partnership Project; Technical Specification Group Radio Access Network; NR; Radio Resource Control (RRC) protocol specification (Release 15).
TSG-RAN WG1, "LS on RRC Parameters for NR URLLC", R1-1807921, 3GPP TSG RAN WG1 Meeting #93, Busan, Korea, May 21-25, 2018.
Samsung, "CQI and MCS Tables for URLLC", R1-1806747, 3GPP TSG RAN WG1 Meeting #93, Busan, Korea, May 21-25, 2018.
3GPP TR 38.913, "3rd Generation Partnership Project; Technical Specification Group Radio Access Network; Study on Scenarios and Requirements for Next Generation Access Technologies; (Release 14)", V14.3.0 (Jun. 2017).

* cited by examiner

| MCS Index $I_{MCS}$ | Modulation Order $Q_m$ | Code rate R × 1024 | Spectral efficiency |
|---|---|---|---|
| 0 | 2 | 30 | 0.0586 |
| 1 | 2 | 40 | 0.0781 |
| 2 | 2 | 50 | 0.0977 |
| 3 | 2 | 64 | 0.1250 |
| 4 | 2 | 78 | 0.1523 |
| 5 | 2 | 99 | 0.1934 |
| 6 | 2 | 120 | 0.2344 |
| 7 | 2 | 157 | 0.3066 |
| 8 | 2 | 193 | 0.3770 |
| 9 | 2 | 251 | 0.4902 |
| 10 | 2 | 308 | 0.6016 |
| 11 | 2 | 379 | 0.7402 |
| 12 | 2 | 449 | 0.8770 |
| 13 | 2 | 526 | 1.0273 |
| 14 | 2 | 602 | 1.1758 |
| 15 | 4 | 340 | 1.3281 |
| 16 | 4 | 378 | 1.4766 |
| 17 | 4 | 434 | 1.6953 |
| 18 | 4 | 490 | 1.9141 |
| 19 | 4 | 553 | 2.1602 |
| 20 | 4 | 616 | 2.4063 |
| 21 | 6 | 438 | 2.5664 |
| 22 | 6 | 466 | 2.7305 |
| 23 | 6 | 517 | 3.0293 |
| 24 | 6 | 567 | 3.3223 |
| 25 | 6 | 616 | 3.6094 |
| 26 | 6 | 666 | 3.9023 |
| 27 | 6 | 719 | 4.2129 |
| 28 | 6 | 772 | 4.5234 |
| 29 | 2 | reserved | |
| 30 | 4 | reserved | |
| 31 | 6 | reserved | |

FIG. 3

| MCS Index $I_{MCS}$ | Modulation Order $Q_m$ | Target Code rate R × [1024] | Spectral efficiency |
|---|---|---|---|
| 0 | 2 | 120 | 0.2344 |
| 1 | 2 | 157 | 0.3066 |
| 2 | 2 | 193 | 0.3770 |
| 3 | 2 | 251 | 0.4902 |
| 4 | 2 | 308 | 0.6016 |
| 5 | 2 | 379 | 0.7402 |
| 6 | 2 | 449 | 0.8770 |
| 7 | 2 | 526 | 1.0273 |
| 8 | 2 | 602 | 1.1758 |
| 9 | 2 | 679 | 1.3262 |
| 10 | 4 | 340 | 1.3281 |
| 11 | 4 | 378 | 1.4766 |
| 12 | 4 | 434 | 1.6953 |
| 13 | 4 | 490 | 1.9141 |
| 14 | 4 | 553 | 2.1602 |
| 15 | 4 | 616 | 2.4063 |
| 16 | 4 | 658 | 2.5703 |
| 17 | 6 | 438 | 2.5664 |
| 18 | 6 | 466 | 2.7305 |
| 19 | 6 | 517 | 3.0293 |
| 20 | 6 | 567 | 3.3223 |
| 21 | 6 | 616 | 3.6094 |
| 22 | 6 | 666 | 3.9023 |
| 23 | 6 | 719 | 4.2129 |
| 24 | 6 | 772 | 4.5234 |
| 25 | 6 | 822 | 4.8164 |
| 26 | 6 | 873 | 5.1152 |
| 27 | 6 | 910 | 5.3320 |
| 28 | 6 | 948 | 5.5547 |
| 29 | 2 | reserved | |
| 30 | 4 | reserved | |
| 31 | 6 | reserved | |

FIG. 4

| MCS Index $I_{MCS}$ | Modulation Order $Q_m$ | Target Code rate R × [1024] | Spectral efficiency |
|---|---|---|---|
| 0 | 2 | 120 | 0.2344 |
| 1 | 2 | 193 | 0.3770 |
| 2 | 2 | 308 | 0.6016 |
| 3 | 2 | 449 | 0.8770 |
| 4 | 2 | 602 | 1.1758 |
| 5 | 4 | 378 | 1.4766 |
| 6 | 4 | 434 | 1.6953 |
| 7 | 4 | 490 | 1.9141 |
| 8 | 4 | 553 | 2.1602 |
| 9 | 4 | 616 | 2.4063 |
| 10 | 4 | 658 | 2.5703 |
| 11 | 6 | 466 | 2.7305 |
| 12 | 6 | 517 | 3.0293 |
| 13 | 6 | 567 | 3.3223 |
| 14 | 6 | 616 | 3.6094 |
| 15 | 6 | 666 | 3.9023 |
| 16 | 6 | 719 | 4.2129 |
| 17 | 6 | 772 | 4.5234 |
| 18 | 6 | 822 | 4.8164 |
| 19 | 6 | 873 | 5.1152 |
| 20 | 8 | 682.5 | 5.3320 |
| 21 | 8 | 711 | 5.5547 |
| 22 | 8 | 754 | 5.8906 |
| 23 | 8 | 797 | 6.2266 |
| 24 | 8 | 841 | 6.5703 |
| 25 | 8 | 885 | 6.9141 |
| 26 | 8 | 916.5 | 7.1602 |
| 27 | 8 | 948 | 7.4063 |
| 28 | 2 | reserved | |
| 29 | 4 | reserved | |
| 30 | 6 | reserved | |
| 31 | 8 | reserved | |

FIG. 5

- For DCI format 0_0/1_0 in CSS, existing 64QAM MCS table is used.
- For DCI formats 0_0/1_0/0_1/1_1 in USS, U-MCS is used.

FIG. 6

- If the DCI CRC is scrambled with the U-RNTI, the U-MCS is used
- Otherwise, follow existing NR behaviour.

FIG. 7

```
RRCReconfiguration message

RRCReconfiguration ::=           SEQUENCE {
    rrc-TransactionIdentifier        RRC-TransactionIdentifier,
    criticalExtensions               CHOICE {
        rrcReconfiguration               RRCReconfiguration-IEs,
        criticalExtensionsFuture         SEQUENCE {}
    }
}

RRCReconfiguration-IEs ::=       SEQUENCE {
    radioBearerConfig                RadioBearerConfig    OPTIONAL, -- Need M
    secondaryCellGroup               OCTET STRING (CONTAINING CellGroupConfig)    OPTIONAL, -- Need M
    U-RNTI        U-RNTI-Value
}
```

FIG. 9

```
                    CellGroupConfig information element

CellGroupConfig ::=         SEQUENCE {
    cellGroupId                 CellGroupId,
    rlc-BearerToAddModList      SEQUENCE (SIZE(1..maxLC-ID)) OF RLC-Bearer-Config    OPTIONAL,
    rlc-BearerToReleaseList     SEQUENCE (SIZE(1..maxLC-ID)) OF LogicalChannelIdentity OPTIONAL,
    mac-CellGroupConfig         MAC-CellGroupConfig       OPTIONAL, -- Need M
    physicalCellGroupConfig     PhysicalCellGroupConfig              OPTIONAL, -- Need M
    spCellConfig                SpCellConfig              OPTIONAL,             -- Need M
    sCellToAddModList           SEQUENCE (SIZE (1..maxNrofSCells)) OF SCellConfig   OPTIONAL,
    sCellToReleaseList          SEQUENCE (SIZE (1..maxNrofSCells)) OF SCellIndex    OPTIONAL,
    U-RNTI                      U-RNTI-Value
    (...)
}
```

FIG. 10

```
CellGroupConfig information element

CellGroupConfig ::=        SEQUENCE {
    cellGroupId                CellGroupId,
    rlc-BearerToAddModList     SEQUENCE (SIZE (1..maxLC-ID)) OF RLC-Bearer-Config OPTIONAL,
    rlc-BearerToReleaseList    SEQUENCE (SIZE (1..maxLC-ID)) Of LogicalChannelIdentity OPTIONAL,
    mac-CellGroupConfig        MAC-CellGroupConfig  OPTIONAL, -- Need M
    physicalCellGroupConfig    PhysicalCellGroupConfig                      OPTIONAL, -- Need M
    spCellConfig               SpCellConfig                     OPTIONAL,    -- Need M
    sCellToAddModList          SEQUENCE (SIZE (1..maxNrofSCells)) OF SCellConfig  OPTIONAL,
    sCellToReleaseList         SEQUENCE (SIZE (1..maxNrofSCells)) OF SCellIndex  OPTIONAL,
    (...)

PhysicalCellGroupConfig ::=  SEQUENCE {
    harq-ACK-SpatialBundlingPUCCH  ENUMERATED {true}                    OPTIONAL, -- Need R
    harq-ACK-SpatialBundlingPUSCH  ENUMERATED {true}      OPTIONAL, -- Need R
    p-NR                           P-Max                  OPTIONAL, -- Need R
    pdsch-HARQ-ACK-Codebook        ENUMERATED {semiStatic, dynamic},
    tpc-SRS-RNTI                   RNTI-Value             OPTIONAL, -- Need R
    tpc-PUCCH-RNTI                 RNTI-Value             OPTIONAL, -- Need R
    tpc-PUSCH-RNTI                 RNTI-Value             OPTIONAL, -- Need R
    U-RNTI                         U-RNTI-Value
    (...)
}
```

FIG. 11

```
MAC-CellGroupConfig information element

MAC-CellGroupConfig ::=    SEQUENCE {
    drx-Config                 SetupRelease { DRX-Config }         OPTIONAL, -- Need M
    schedulingRequestConfig    SchedulingRequestConfig             OPTIONAL, -- Need M
    bsr-Config                 BSR-Config                          OPTIONAL, -- Need M
    tag-Config                 TAG-Config                          OPTIONAL, -- Need M
    phr-Config                 SetupRelease { PHR-Config }         OPTIONAL, -- Need M
    skipUplinkTxDynamic        BOOLEAN,
    cs-RNTI                    SetupRelease { RNTI-Value }         OPTIONAL, -- Need M
    U-RNTI                     U-RNTI-Value
}
```

FIG. 12

```
                    ServingCellConfigCommon information element

ServingCellConfigCommon ::=    SEQUENCE {
    physCellId                  PhysCellId                      OPTIONAL,
    frequencyInfoDL             FrequencyInfoDL                 OPTIONAL,
    initialDownlinkBWP          BWP-DownlinkCommon              OPTIONAL,
    uplinkConfigCommon          UplinkConfigCommon              OPTIONAL,
    supplementaryUplinkConfig           UplinkConfigCommon      OPTIONAL,
    ssb-PositionsInBurst        CHOICE {
        shortBitmap                 BIT STRING (SIZE (4)),
        mediumBitmap                BIT STRING (SIZE (8)),
        longBitmap                  BIT STRING (SIZE (64))
    } OPTIONAL,
    ssb-periodicityServingCell  ENUMERATED { ms5, ms10, ms20, ms40, ms80, ms160,
                                spare2, spare1 }
    OPTIONAL,
    (...)
    subcarrierSpacing           SubcarrierSpacing
    OPTIONAL, -- Need S
    ...
}
UplinkConfigCommon ::=          SEQUENCE {
    frequencyInfoUL             FrequencyInfoUL                 OPTIONAL,
    initialUplinkBWP            BWP-UplinkCommon                OPTIONAL
}
U-RNTI                          U-RNTI-Value
```

FIG. 13

```
ServingCellConfig information element
ServingCellConfig ::=    SEQUENCE {
    tdd-UL-DL-ConfigurationDedicated    TDD-UL-DL-ConfigDedicated        OPTIONAL, -- Cond TDD
    initialDownlinkBWP              BWP-DownlinkDedicated            OPTIONAL, -- Cond ServCellAdd
    downlinkBWP-ToReleaseList       SEQUENCE (SIZE (1..maxNrofBWPs)) OPTIONAL, -- Need N
                                    OF BWP-Id
    downlinkBWP-ToAddModList        SEQUENCE (SIZE (1.. maxNrof      OPTIONAL,    -- Need N
                                    BWPs)) OF BWP-Downlink
    firstActiveDownlinkBWP-Id       BWP-Id                           OPTIONAL, -- Need R
    bwp-InactivityTimer             ENUMERATED {ms2, ms3, ...,       OPTIONAL,
                                    spare2, spare1}
    defaultDownlinkBWP-Id           BWP-Id                OPTIONAL,  -- Need M
    uplinkConfig                    UplinkConfig                     OPTIONAL,
    supplementaryUplink                 UplinkConfig                 OPTIONAL,
    pdsch-ServingCellConfig             SetupRelease { PDSCH-        OPTIONAL, -- Need M
                                        ServingCellConfig }
    csi-MeasConfig                      SetupRelease { CSI-MeasConfig }  OPTIONAL, -- Need M
        carrierSwitching                SetupRelease { SRS-CarrierSwitching } OPTIONAL, -- Need M
    sCellDeactivationTimer          ENUMERATED {ms20, ms40, ...,     OPTIONAL,
                                    spare2, spare1}
    crossCarrierSchedulingConfig    CrossCarrierSchedulingConfig     OPTIONAL,
    tag-Id                              TAG-Id,
    ue-BeamLockFunction                 ENUMERATED {enabledl}        OPTIONAL, -- Need R
    pathlossReferenceLinking        ENUMERATED {pCell, sCell}        OPTIONAL
}
UplinkConfig ::=          SEQUENCE {
    initialUplinkBWP                BWP-UplinkDedicated              OPTIONAL,
    uplinkBWP-ToReleaseList         SEQUENCE (SIZE (1.               OPTIONAL, -- Need N
                                    maxNrofBWPs)) OF BWP-Id
    uplinkBWP-ToAddModList          SEQUENCE (SIZE (1. maxNrofBWPs)) OPTIONAL,
                                    OF BMP-Uplink
    firstActiveUplinkBWP-Id         BWP-Id              OPTIONAL, -- Need R
    pusch-ServingCellConfig             SetupRelease { PUSCH-        OPTIONAL, -- Need M
                                        ServingCellConfig }
    ...
}
U-RNTI                              U-RNTI-Value
```

FIG. 14

```
                    BWP information element
BWP ::=                 SEQUENCE {
    locationAndBandwidth    INTEGER (0..37949),
    subcarrierSpacing       SubcarrierSpacing,
    cyclicPrefix            ENUMERATED { extened }        OPTIONAL, -- Need R
    U-RNTI                                  U-RNTI-Value
}
BWP-Uplink ::=          SEQUENCE {
    bwp-Id                  BWP-Id,
    bwp-Common              BWP-UplinkCommon             OPTIONAL, -- Need M
    bwp-Dedicated           BWP-UplinkDedicated          OPTIONAL, -- Need M
}
BWP-UplinkCommon ::=    SEQUENCE {
    genericParameters       BWP,
    rach-ConfigCommon       SetupRelease { RACH-ConfigCommon }   OPTIONAL, -- Need M
    pusch-ConfigCommon      SetupRelease { PUSCH-ConfigCommon }  OPTIONAL, -- Need M
    pucch-ConfigCommon      SetupRelease { PUCCH-ConfigCommon }  OPTIONAL, -- Need M
}
BWP-UplinkDedicated ::= SEQUENCE {
    pucch-Config            SetupRelease { PUCCH-Config }        OPTIONAL, -- Need M
    pusch-Config            SetupRelease { PUSCH-Config }        OPTIONAL, -- Need M
}
BWP-DownLink ::=        SEQUENCE {
    bwp-Id                  BWP-Id,
    bwp-Common              BWP-DownlinkCommon           OPTIONAL, -- Need M
    bwp-Dedicated           BWP-DownlinkDedicated        OPTIONAL, -- Need M
}
BWP-DownlinkCommon ::=  SEQUENCE {
    genericParameters       BWP,
    pdcch-ConfigCommon      SetupRelease { PDCCH-ConfigCommon }  OPTIONAL, -- Need M
    pdsch-ConfigCommon      SetupRelease { PDSCH-ConfigCommon }  OPTIONAL, -- Need M
}
BWP-DownlinkDedicated ::= SEQUENCE {
    pdcch-Config            SetupRelease { PDCCH-Config }        OPTIONAL, -- Need M
    pdsch-Config            SetupRelease { PDSCH-Config }        OPTIONAL, -- Need M
    sps-Config              SetupRelease { SPS-Config }          OPTIONAL, -- Need M
    radioLinkMonitoringConfig  SetupRelease
}
(...)
```

FIG. 15

*PDCCH-ConfigCommon* information element

```
PDCCH-ConfigCommon ::=     SEQUENCE {
    commonControlResourcesSets      SEQUENCE (SIZE(1..2)) OF ControlResourceSet   OPTIONAL,
    commonSearchSpaces              SEQUENCE (SIZE(1..4)) OF SearchSpace          OPTIONAL,
    searchSpaceSIB1                 SearchSpaceId                                 OPTIONAL,
    searchSpaceOtherSystemInformation  SearchSpaceId                              OPTIONAL,
    pagingSearchSpace               SearchSpaceId                                 OPTIONAL,
    ra-ControlResourceSet           ControlResourceSetId                          OPTIONAL,
    ra-SearchSpace                  SearchSpaceId                                 OPTIONAL,
    ...
    U-RNTI                          U-RNTI-Value
}
```

FIG. 16

```
PDCCH-Config information element

PDCCH-Config  ::=         SEQUENCE {
    controlResourceSetToAddModList    SEQUENCE (SISE (1..3)) OF ControlResourceset      OPTIONAL,
    controlResource SetToReleaseList  SEQUENCE (SIZE (1..3)) OF ControlResourceSetId    OPTIONAL,
    searchSpacesToAddModList          SEQUENCE (SIZE (1..10)) OF Searchspace            OPTIONAL,
    searchSpacesToReleaseList         SEQUENCE (SIZE (1..10)) OF Searchspaceld          OPTIONAL,
    downlinkPreemption                SetupRelease { DownlinkPreemption }               OPTIONAL,
    slotFormatIndicator               SetupRelease { SlotFormatIndicator }              OPTIONAL,
    tps-PUSCH                         SetupRelease { PUSCH-TPC-CommandConfig }          OPTIONAL,
    tps-PUCCH                         SetupRelease { PUCCH-TPC-CommandConfig }          OPTIONAL,
    U-RNTI                            U-RNTI-Value
    ...
}
```

FIG. 17

*PDSCH-ConfigCommon* information element

```
PDSCH-ConfigCommon ::=    SEQUENCE {
pdsch-AllocationList   SEQUENCE (SIZE(1..maxNrofDL-Allocations)) OF PDSCH-TimeDomainResourceAllocation
...
}
```

| U-RNTI | U-RNTI-Value |
|---|---|

FIG. 18

```
                    PDSCH-Config information element
PDSCH-Config ::=        SEQUENCE {
    dataScramblingIdentityPDSCH     INTEGER (0..1007)                   OPTIONAL,
    dmrs-DownlinkForPDSCH-MappingTypeA  SetupRelease { DMRS-DownlinkConfig }  OPTIONAL, -- Need M
    dmrs-DownlinkForPDSCH-MappingTypeB  SetupRelease { DMRS-DownlinkConfig }  OPTIONAL, -- Need M
    tci-StatesToAddModList          SEQUENCE (SIZE (1..maxNrofTCI-States)) OF   OPTIONAL,
                                    TCI-State
    tci-StatesToReleaseList         SEQUENCE (SIZE (1..maxNrofTCI-States)) OF   OPTIONAL,
                                    TCI-StateId
    vrb-ToPRB-Interleaver           ENUMERATED { n2, n4 },
    pasch-AllocationList            SEQUENCE (SIZE (1..maxNrofDL-Allocations)) OF PDSCH-Time
                                    DomainResourceAllocation
    pasch-AggregationFactor         ENUMERATED { n2, n4, n8 }   OPTIONAL, -- Need S
    rbg-Size                        ENUMERATED {Config1, Config2},
    mcs-Table                       ENUMERATED {qam64, qam256},
    maxNrofCodeWordsScheduledByDCI  ENUMERATED {n1, n2},                OPTIONAL,  -- Need R
    prb-BundlingType                CHOICE {
        static                          SEQUENCE {
            bundleSize                  ENUMERATED { n4, wideband }   OPTIONAL
        },
        dynamic                         SEQUENCE {
            bundleSizeSet1              ENUMERATED { n4, wideband, n2-wideband,   OPTIONAL,
                                        n4-wideband }
            bundleSizeSet2              ENUMERATED { n4, wideband }              OPTIONAL
        }
    },
    ...
    U-RNTI                          U-RNTI-Value
}
```

FIG. 19

```
PUSCH-ConfigCommon information element

PUSCH-ConfigCommon ::=            SEQUENCE {
    groupHoppingEnabledTransformPrecoding    ENUMERATED {enabled}                    OPTIONAL,
    pusch-AllocationList                     SEQUENCE (SIZE(1..maxNrofUL-Allocations)) Of
PUSCH-TimeDomainResourceAllocation  OPTIONAL,
    msg3-DeltaPreamble                       INTEGER (-1..6)                         OPTIONAL,
    p0-NominalWithGrant                      INTEGER (-202..24)                      OPTIONAL,
    ...
    U-RNTI                                   U-RNTI-Value
}
```

FIG. 20

*PUSCH-Config* information element

```
PUSCH-Config  ::=                    SEQUENCE{
  dataScramblingIdentityPUSCH          INTEGER (0..1007)                                OPTIONAL,
  txConfig                             ENUMERATED {codebook, nonCodebook},
  dmrs-UplinkForPUSCH-MappingTypeA     SetupRelease { DMRS-UplinkConfig }               OPTIONAL,
  dmrs-UplinkForPUSCH-MappingTypeB     SetupRelease { DMRS-UplinkConfig }               OPTIONAL,
  pusch-PowerControl                   PUSCH-PowerControl                               OPTIONAL,
  frequencyHopping                     ENUMERATED {mode1, mode2}                        OPTIONAL,
  frequencyHoppingOffsetLists          SEQUENCE (SIZE (1..4)) OF INTEGER
                                       (1..maxNrofPhysicalResourceBlocks-1)             OPTIONAL,
  resourceAllocation                   ENUMERATED { resourceAllocationType0,
                                       resourceAllocationType1, dynamicSwitch},
  pusch-AllocationList                 SEQUENCE (SIZE (1..maxNrofUL-Allocations)) OF
                                       PUSCH-TimeDomainResourceAllocation
  OPTIONAL,
  pusch-AggregationFactor              ENUMERATED { n2, n4, n8 }                        OPTIONAL,
  mcs-Table                            ENUMERATED { qam256 }                            OPTIONAL,
  mcs-TableTransformPrecoder           ENUMERATED { qam256 }                            OPTIONAL,
  ...
  U-RNTI                               U-RNTI-Value
}
```

FIG. 21

```
CellGroupConfig information element

CellGroupConfig ::=       SEQUENCE {
    cellGroupId               CellGroupId,
    rlc-BearerToAddModList    SEQUENCE (SIZE(1..maxLC-ID)) OF RLC-Bearer-Config     OPTIONAL,
    rlc-BearerToReleaseList   SEQUENCE (SIZE(1..maxLC-ID)) OF LogicalChannelIdentity OPTIONAL,
    mac-CellGroupConfig       MAC-CellGroupConfig  OPTIONAL, -- Need M
    physicalCellGroupConfig   PhysicalCellGroupConfig                               OPTIONAL, -- Need M
    spCellConfig              SpCellConfig                                OPTIONAL,           -- Need M
    sCellToAddModList         SEQUENCE (SIZE (1..maxNrofSCells)) OF SCellConfig     OPTIONAL,
    sCellToReleaseList        SEQUENCE (SIZE (1..maxNrofSCells)) OF SCellIndex       OPTIONAL,
    (...)

PhysicalCellGroupConfig ::=  SEQUENCE {
    harq-ACK-SpatialBundlingPUCCH  ENUMERATED {true}                      OPTIONAL, -- Need R
    harq-ACK-SpatialBundlingPUSCH  ENUMERATED {true}           OPTIONAL, -- Need R
    p-NR                           P-Max                       OPTIONAL, -- Need R
    pdsch-HARQ-ACK-Codebook        ENUMERATED {semiStatic, dynamic},
    tpc-SRS-RNTI                   RNTI-Value                  OPTIONAL, -- Need R
    tpc-PUCCH-RNTI                 RNTI-Value                  OPTIONAL, -- Need R
    tpc-PUSCH-RNTI                 RNTI-Value                  OPTIONAL, -- Need R
    U-RNTI-H                       U-RNTI-Value OPTIONAL,
    U-RNTI-H                       {Value_1, Value_2, Value_3, Value_4} OPTIONAL,
```

FIG. 22

*PDSCH-Config* information element

```
PDSCH-Config ::=         SEQUENCE {
    dataScramblingIdentityPDSCH         INTEGER (0..1007)
    dmrs-DownlinkForPDSCH-MappingTypeA  SetupRelease { DMRS-DownlinkConfig }
    dmrs-DownlinkForPDSCH-MappingTypeB  SetupRelease { DMRS-DownlinkConfig }
    tci-StatesToAddModList              SEQUENCE (SIZE (1..maxNrofTCI-States)) OF
    tci-StatesToReleaseList             SEQUENCE (SIZE (1..maxNrofTCI-States)) OF
    vrb-ToPRB-Interleaver               ENUMERATED {n2, n4},
    pdsch-AllocationList                SEQUENCE (SIZE (1..maxNrofDL-Allocations)) OF PDSCH-Time
    pdsch-AggregationFactor             ENUMERATED {n2, n4, n8}
    rbg-Size                            ENUMERATED {config1, config2},
    mcs-Table                           ENUMERATED {qam64, qam256},
    maxNrofCodeWordsScheduledByDCI      ENUMERATED {n1, n2}
    prb-BundlingType                    CHOICE {
        static                              SEQUENCE {
            bundleSize                          ENUMERATED { n4, wideband }     OPTIONAL
        },
        dynamic                             SEQUENCE {
            bundleSizeSet1                      ENUMERATED { n4, wideband, n2-wideband, n4-wideband }
            bundleSizeSet2                      ENUMERATED { n4, wideband }     OPTIONAL
        }
    },
    ...
    U-RNTI-II                                                       OPTIONAL,
    U-RNTI-II                           bitstream
}
```

FIG. 23

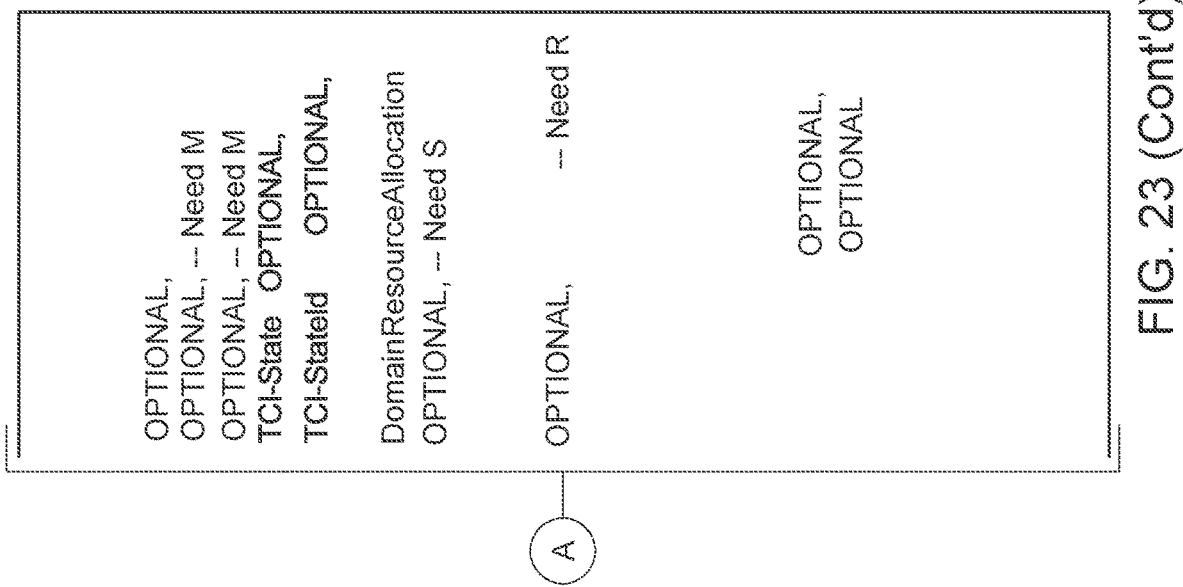

```
ConfiguredGrantConfig information element

ConfiguredGrantConfig ::=           SEQUENCE {
    frequencyHopping                ENUMERATED {mode1, mode2},
    cg-DMRS-Configuration           DMRS-UplinkConfig,
    mcs-Table                       ENUMERATED { qam64, qam256 },
    mcs-TableTransformPrecoder      ENUMERATED { qam256 }                OPTIONAL, -- Need S
    uci-OnPUSCH                     SetupRelease { CG-UCI-OnPUSCH },
    resourceAllocation              ENUMERATED { resourceAllocationType0, resourceAllocationType1, dynamicSwitch },
    rbg-Size                        ENUMERATED {config2}                 OPTIONAL,
    powerControlLoopToUse           ENUMERATED {n0, n1},
    p0-PUSCH-Alpha                  P0-PUSCH-AlphaSetId,
    transformPrecoder               ENUMERATED {enabled}                 OPTIONAL, -- Need R
    nrofHARQ-Processes              INTEGER (1..16),
    repK                            ENUMERATED {n1, n2, n4, n8},
    repK-RV                         ENUMERATED {s1-0231, s2-0303, s3-0000}  OPTIONAL,
    periodicity                     ENUMERATED {sym2, sym7, ...},
    configuredGrantTimer            ENUMERATED {sym2, sym7, ...}         OPTIONAL,
    rrc-ConfiguredUplinkGrant       SEQUENCE {
        timeDomainOffset            INTEGER (0..5119),
```

```
    timeDomainAllocation            INTEGER    (0..15),
    frequencyDomainAllocation       BIT STRING (SIZE(18)),
    antennaPort                     INTEGER    (0..31),
    dmrs-SeqInitialization          INTEGER    (0..1)                              OPTIONAL,
    precodingAndNumberOfLayers      INTEGER    (0..63),
    srs-ResourceIndicator           INTEGER    (0..15),
    mcsAndTBS                       INTEGER    (0..31),
    frequencyHoppingOffset          INTEGER    (1..maxNrofPhysicalResourceBlocks-1),
    pathlossReferenceIndex          INTEGER    (0..maxNrofPUSCH-PathlossReferenceRSs-1),
    ...
  } Optional
}
CS-UCI-onPUSCH ::= CHOICE {
    dynamic       SEQUENCE (SIZE (1..4)) OF BetaOffsets,
    semiStatic    BetaOffsets
}
U-RNTI-II                                                OPTIONAL,
U-RNTI-III                                               OPTIONAL,
```

FIG. 24(Cont'd)

CONFIGURATION OF ULTRA RELIABLE LOW LATENCY COMMUNICATION

CROSS-REFERENCES TO RELATED APPLICATIONS

This application is a continuation of U.S. patent application Ser. No. 16/436,638, filed on Jun. 10, 2019, which claims the benefit of U.S. Provisional Patent No. 62/685,368, filed Jun. 15, 2018, the contents of which are hereby incorporated by reference in their entirety.

FIELD

This application is generally related to 5G technology. For example, aspects of this application relate to the configuration of an Ultra Reliable Low Latency Communication (URLLC) service.

BACKGROUND

5G New Radio (NR) Access Technology was approved by the 3GPP standards body at its $71^{st}$ Plenary. The 5G NR scheme includes Enhanced Mobile Broadband (eMBB), URLLC, and massive Machine Type Communication (mMTC). eMBB provides greater data bandwidth as compared to previous implementations, and also delivers latency improvements and a wide coverage area. These improvements complement many high bandwidth applications, such as virtual reality, augmented reality, streaming video, real-time translation, and more. mMTC provides high coverage, cost efficiency, lower power consumption, and long availability, allowing for connections with many devices over a robust connection. URLLC is another important use case of 5G NR. URLLC has strict requirements for latency and reliability in order to support the most critical communications. A goal of URLLC is to meet the performance requirements set forth in Technical Report (TR) 38.913.

To support such diverse use cases as eMBB, URLLC, and mMTC, the radio frame structure and the majority of the medium access (MAC) layer procedures in new radio (NR) are designed to have high flexibility. In addition, NR introduces a brand new type of radio resource which has the characteristic of more robustness (i.e., low block error rate (BLER) level) than previous versions. The new type of radio resource aims to achieve a 1e−5 target BLER.

SUMMARY

Aspects of this application introduce methods, apparatuses, and computer-readable media for configuring a URLLC service. According to the current data scheduling design within user equipment (UE)'s MAC entity, the MAC can differentiate between the usage of uplink resources granted from a gNodeB (gNB) in subcarrier spacing (SCS), which is related to the transmission delay (e.g., transmission time interval). However, the MAC entity cannot differentiate the BLER level of different radio resources. For example, a gNB has flexibility in granting radio resources of different BLER levels (e.g., at least there will be one BLER level of $10^{-1}$ and another BLER level of $10^{-5}$). The inability of the MAC entity of the UE to differentiate the BLER level of different radio resources may seriously affect the fairness of the usage between eMBB and URLLC service. The current MAC procedures within the UE need further enhancement to achieve more efficient operations.

Aspects of this disclosure address these problems and others using various techniques described herein. In one example, a method is provided for configuring URLLC service. The method can determine a radio network temporary identifier (RNTI) associated with a UE. The method comprises receiving, at user equipment (UE), a downlink radio resource control (RRC) message including a plurality of information elements (IEs). The downlink RRC message is used to configure RRC for the UE. The method further comprises determining an RNTI associated with the UE based on a cell group-specific IE of the plurality of IEs in the downlink RRC message. The cell group-specific IE is used to configure a cell group (CG), master cell group (MCG) or a secondary cell group (SCG). The RNTI is configured for cells within the MCG or SCG based on the cell group-specific IE.

In some aspects, configuration parameters for the MCG or SCG are provided in the cell group-specific IE.

In some aspects, the RNTI is a Modulation Coding Scheme Cell-RNTI (MCS-C-RNTI). In some aspects, the method further comprises receiving uplink grant and downlink data scheduling for the UE on one or more physical shared channels of the MCG or SCG. In some aspects, an RNTI-based modulation coding scheme (MCS) determination rule is applied to the uplink grant and downlink data scheduling in response to the MCS-C-RNTI being configured via the cell group-specific IE. In some aspects, applying the RNTI-based MCS determination rule includes obtaining information from a physical downlink control channel (PDCCH), determining one or more cyclic redundancy check (CRC) bits in the information are scrambled with the RNTI, and applying a first modulation coding scheme (MCS) table based on the determination. In some aspects, the information obtained from the PDCCH includes downlink control information (DCI), the DCI including the one or more CRC bits scrambled with the RNTI. In some aspects, the first MCS table is associated with a higher channel code rate than a second MCS table.

In some aspects, a method of applying a search space-based modulation coding scheme (MCS) table determination rule is provided. The method comprises obtaining downlink control information (DCI) from a downlink channel. The method further comprises determining a DCI format associated with the DCI. The method further comprises determining whether a search space associated with the downlink channel is a common search space (CSS) or a user equipment specific search space (USS). The method further comprises applying a first modulation coding scheme (MSC) table or a second MCS table based on the DCI format and the search space.

In some aspects, the DCI format is 0_0 DCI format or a 1_0 DCI format, the search space is the CSS, and the first MCS table is applied based on the search space being the CSS and the DCI format being the 0_0 DCI format or the 1_0 DCI format. In some aspects, the first MCS table is a 64 quadrature amplitude modulation (64QAM) MCS table.

In some aspects, the DCI format is a 0_0 DCI format, a 1_0 DCI format, a 0_1 DCI format, or a 1_1 DCI format, the search space is the USS, and the second MCS table is applied based on the search space being the USS and the DCI format being the 0_0 DCI format, the 1_0 DCI format, the 0_1 DCI format, or the 1_1 DCI format. In some aspects, the second MCS table is associated with a higher channel code rate than the first MCS table. In some aspects, the second MCS table is an Ultra-reliable and Low Latency Communications (URLLC)-MCS table.

In some aspects, the first MCS table or the second MCS table is applied for uplink grant and downlink data scheduling.

In some aspects, a method of applying an RNTI-based MCS table determination rule is provided. The method comprises obtaining information from a physical downlink control channel (PDCCH). The method further comprises determine one or more cyclic redundancy check (CRC) bits in the information are scrambled with a Radio Network Temporary Identifier (RNTI). The method further comprises applying a first modulation coding scheme (MCS) table based on the determination.

In some aspects, the information obtained from the PDCCH includes downlink control information (DCI), the DCI including the one or more CRC bits scrambled with the RNTI. In some aspects, the method further comprises descrambling the DCI with the RNTI.

In some aspects, the first MCS table is associated with a higher channel code rate than a second MCS table. In some aspects, the first MCS table is a Ultra-Reliable and Low Latency Communications (URLLC)-MCS (U-MCS) table.

In some aspects, the method further comprises determining one or more CRC bits in information of an additional PDCCH are not scrambled with the RNTI, and applying a second MCS table based on the determination. In some aspects, the first MCS table is associated with a higher channel code rate than the second MCS table.

In some aspects, the RNTI is a Modulation Coding Scheme Cell-RNTI (MCS-C-RNTI), or a U-RNTI.

In another example, an apparatus is provided. The apparatus includes a memory configured to store the one or more datasets and a processor coupled to the memory. The processor is configured to perform steps including the steps of the above methods.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present application are described in detail below with reference to the following drawing:

FIG. 3 is an example of a MCS table for high reliability transmission, in accordance with some examples provided herein;

FIG. 4 is an example of a MCS table for 64QAM for normal reliability transmission, in accordance with some examples provided herein;

FIG. 5 is an example of a MCS table for 256QAM for normal reliability transmission, in accordance with some examples provided herein;

FIG. 6 is an SS-based MCS table determination rule, in accordance with some examples provided herein;

FIG. 7 is an RNTI-based MCS table determination rule, in accordance with some examples provided herein;

FIG. 9 is an example of a text proposal (TP) per UE-configured U-RNTI IE, in accordance with some examples provided herein;

FIG. 10 is an example of a TP per cell group configured U-RNTI IE, in accordance with some examples provided herein;

FIG. 11 is an example of a TP per cell group configured U-RNTI IE, in accordance with some examples provided herein;

FIG. 12 is an example of a TP per cell group configured U-RNTI IE, in accordance with some examples provided herein;

FIG. 13 is an example of a TP per cell configured U-RNTI IE, in accordance with some examples provided herein;

FIG. 14 is an example of a TP per cell configured U-RNTI IE, in accordance with some examples provided herein;

FIG. 15 is an example of a TP per BWP configured U-RNTI IE, in accordance with some examples provided herein;

FIG. 16 is an example of a TP per control channel configured U-RNTI IE, in accordance with some examples provided herein;

FIG. 17 is an example of a TP per control channel configured U-RNTI IE, in accordance with some examples provided herein;

FIG. 18 is an example of a TP per downlink data channel configured U-RNTI IE, in accordance with some examples provided herein;

FIG. 19 is an example of a TP per downlink data channel configured U-RNTI IE, in accordance with some examples provided herein;

FIG. 20 is an example of a TP per uplink data channel configured U-RNTI IE, in accordance with some examples provided herein;

FIG. 21 is an example of a TP per uplink data channel configured U-RNTI IE, in accordance with some examples provided herein;

FIG. 22 is an example of a TP per cell group configured U-RNTI-I IE, in accordance with some examples provided herein;

FIG. 23 is an example of a TP per downlink data channel configured U-RNTI-II IE, in accordance with some examples provided herein;

FIG. 24 is an example of a TP of U-RNTI-II for configured grant IE, in accordance with some examples provided herein;

DETAILED DESCRIPTION

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

As noted above, the 5G New Radio (NR) Access Technology includes the enhanced Mobile Broadband (eMBB), Ultra Reliable Low Latency Communication (URLLC), and massive Machine Type Communication (mMTC) services. The eMBB service may be used to provide high data rates across a wide coverage area. The URLLC service may be used to achieve high reliability and low latency in a wireless network. The mMTC service provides high coverage, cost efficiency, lower power consumption, and long availability. To support such diverse use cases as eMBB, URLLC, and mMTC, the radio frame structure and the majority of the medium access (MAC) layer procedures in new radio (NR) are designed to have high flexibility. In addition, NR introduces a brand new type of radio resource which has the characteristic of more robustness (e.g., low block error rate (BLER) level) than previous versions. The new type of radio resource aims to achieve a 1e−5 target BLER.

Techniques are described herein for configuring a URLLC service (for high reliability and low latency). The techniques can enhance network performance (e.g., of a gNB), enhance MAC procedures within the UE to achieve more efficient operations, among others enhancements. In some examples, techniques are described for determining an MCS table to apply based on various factors (e.g., search space, based on an RNTI, etc.). In some examples, different techniques are described for configuring a UE with an RNTI based on different considerations (e.g., per cell group, per UE, per cell, per bandwidth part (BWP), per control channel, per downlink data channel, per uplink channel, or other considerations). Before discussing such techniques, an example of a wireless communication system will be described with respect to FIG. 1 and FIG. 2.

Figure 1:
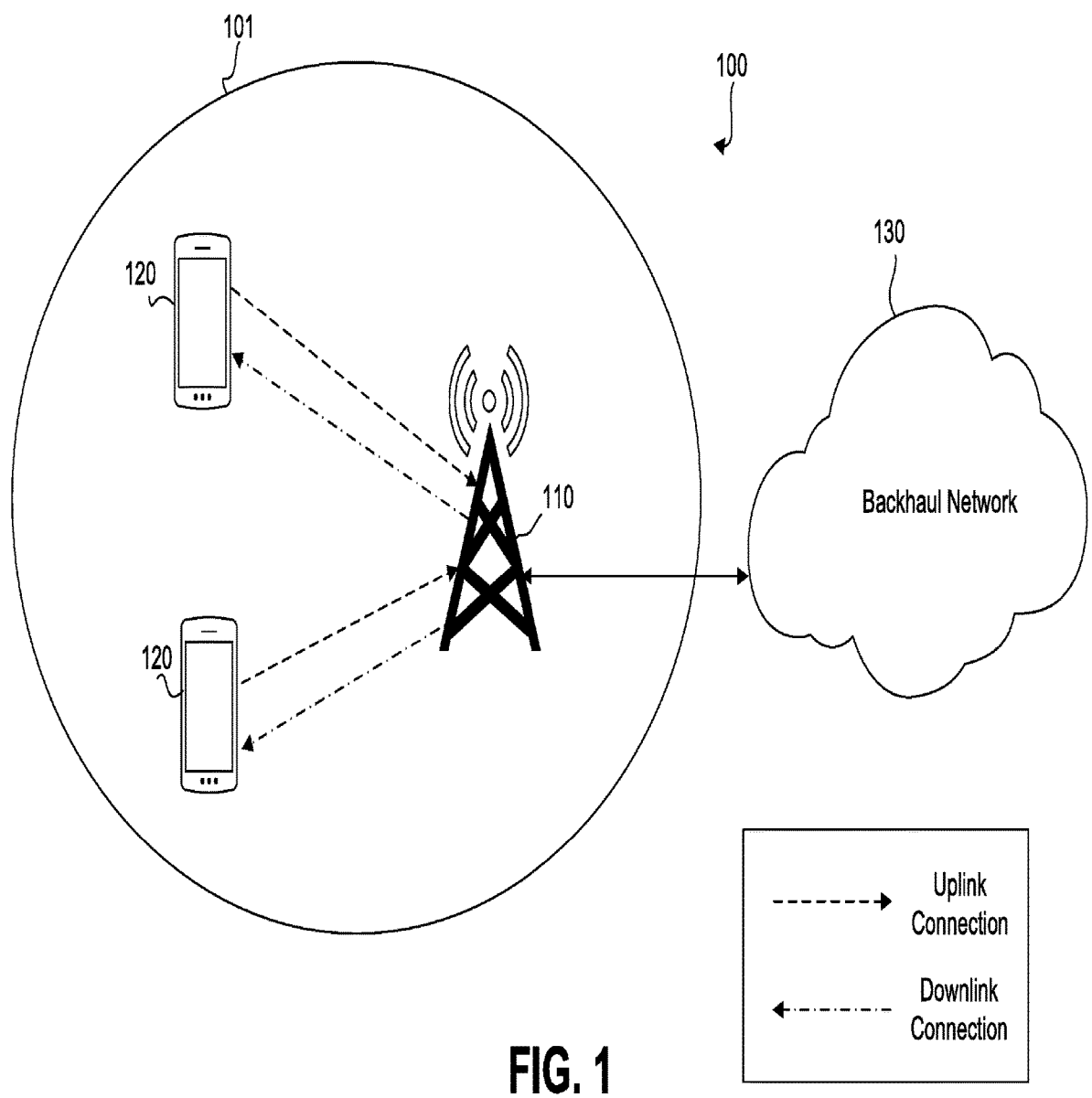
FIG. 1 illustrates a network for communicating data streams, in accordance with some examples provided herein.

FIG. 1 is a diagram illustrating a network 100 for communicating data streams. As used herein, "data streams" may include voice streams and streaming data for text messaging such as short message service (SMS) messages, multimedia message service (MMS) messages, applications, uploads, downloads, e-mails, and the like. The network 100 may comprise an access point (AP) 110. The AP 110 may be any component or collection of components configured to provide wireless access, such as a base station. The base station may be, for example, an enhanced base station (eNB or eNodeB), or Next Generation nodeB (gNB). The AP 110 may have a coverage area 101 (such as a cell), one or more mobile devices 120, and a backhaul network 130. Although shown and described as having two mobile devices 120, it is contemplated that there can be any number of mobile devices 120, ranging from just one mobile device 120 to thousands or even more mobile devices 120.

The AP 110 may establish uplink and/or downlink connections with the mobile devices 120. The uplink and/or downlink connections may carry data between the mobile devices 120 and the AP 110. Although a certain number of components are shown and described, it is contemplated that any number of additional components may be provided or may be omitted from FIG. 1 for the purpose of simplicity, such as routers, relays, remote radio heads, and the like.

5G represents the fifth generation of digital cellular networks. 3GPP generally refers to 5G New Radio (5G NR) as "5G". Worldwide, companies are beginning to offer 5G hardware and systems for carriers, which are providing high download and upload speeds as compared to previous technologies. In general, as with previous wireless technologies, 5G service areas are divided into geographical areas called cells. When user equipment crosses from one geographical cell to another, the communication is handed off between two geographical cells in such a way that the communication is not dropped and little to no observable differences are seen.

Figure 2:
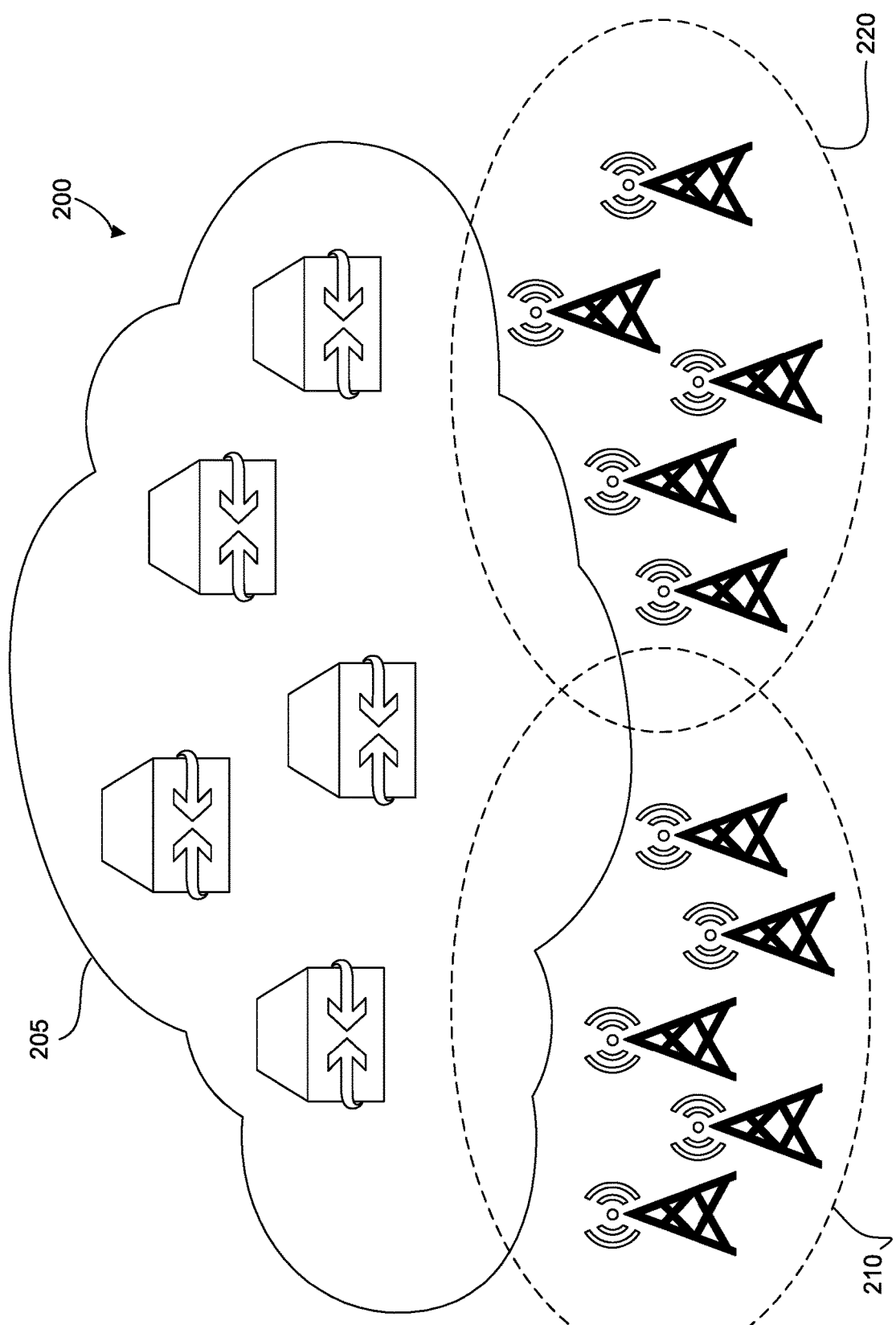
FIG. 2 illustrates a 5G network architecture comprising a wireless network serving multiple RANs, in accordance with some examples provided herein.

Aspects of the present disclosure may be implemented in 5G wireless networks that may include multiple radio access networks (RANs). FIG. 2 is a diagram illustrating a 5G network architecture 200 comprising a wireless network 205 serving multiple RANs, including a first RAN 210 and a second RAN 220. The wireless network may comprise various gateway devices, such as serving gateways and pack data network gateways. In addition, the RANs may include one or more APs, such as base stations or nodes, which can include gNBs for 5G telecommunications networks.

Three main types of use cases have been defined for 3G: eMBB, URLLC, and Massive Machine Type Communications (mMTC). eMBB appreciates faster connections, more capacity, and higher throughput as compared to 4G. For example, eMBB may appreciate 10-20 Gbps peak, 100 Mbps when needed, up to 10,000 times more traffic, support for macro and small cells, support at up to 500 km/h for high mobility, and significant network energy savings. URLLC provides uninterrupted data exchange for mission critical applications that may require fast response rates. For example, URLLC may be extremely responsive with under 1 millisecond (ms) of air interface latency. In addition, URLLC may be highly reliable and available at rates of almost 100%. URLLC appreciates low to medium data rates and high speed mobility. As compared to 4G, URLLC may appreciate a latency target of 1 ms, while eMBB appreciates a latency target of 4 ms. In comparison, 4G can and do experience latency times of greater than 20 ms. mMTC supports scalability and increased lifetime due to a large number of low power devices in a widespread area. For example, mMTC may support a high density of devices over a long range, a low data rate, low cost, and long lasting battery power.

Block Error Rate (BLER) is a measurement type of quality in telecommunication systems. An example calculation of the BLER measurement is as follows:

$$BLER = \frac{\text{Number of Erroneous Blocks}}{\text{Total Number of Transmitted (or Received) Blocks}}$$

The BLER calculation can be based on a Cyclic Redundancy Check (CRC) evaluation, which is used for inspection of the transport blocks at the UE side. CRC can be attached to each transport block and sent by a transmitter (e.g., a gNB). At the destination (e.g., UE), the transport block can be cross checked by the UE. An erroneous block can be defined as a transport block including a CRC that is wrong (or in error). The transport block can be successfully decoded if the attached CRC matches the CRC calculated by the receiver. Retransmission can be performed for the blocks that are received in error.

A radio network temporary identifier (RNTI) is used to differentiate and/or identify one specific radio channel from other radio channel and/or one device (e.g., UE) from another device. For example, an RNTI can identify a connected UE in a cell, a specific radio channel, a group of UEs in case of paging, a group of UEs for which power control is issued by the eNB, system information transmitted for all the UEs by a gNB, and/or other identifications. In some cases, a downlink control information (DCI) message (e.g., the CRC bits of each DCI) can be scrambled by a specific RNTI value.

In general, URLLC service has stronger requirements on the radio resources, with lower BLER level requirements as compared to eMBB service. eMBB service places more emphasis on the data rate than the BLER level, at least in part because the eMBB service can also be satisfied with normal BLER level radio resources (e.g., BLER level of $10^{-1}$; it is noted that the notation $10^{-1}$ can also be written as 1e–1, and the $10^{-5}$ notation can be written as 1e–5.). Hence, if radio resources and/or data granted from a gNB are targeting low BLER, the MAC may prioritize the low BLER radio resource to be adopted by the URLLC service rather than the eMBB service, in which case the URLLC service will be able to use the radio resource over the eMBB service.

Due to flexible granting by the gNB of different BLER levels (e.g., at least there will be one BLER level of $10^{-1}$ and another BLER level of $10^{-5}$) of radio resources, the current MAC procedures within the UE need further enhancement to achieve more efficient operation. For example, the MAC of the UE may not be able to differentiate the BLER level of different radio resources, which can negatively affect the fairness of the usage between eMBB and URLLC service.

Further, in order to indicate a proper modulation and coding scheme (MCS) of granted radio resources which have different target BLER levels, the gNB needs to refer to the channel quality indicator (CQI) reported by the UE based on each of the supporting BLER levels. During uplink grant and downlink data scheduling, a gNB indicates the MCS and/or BLER of the radio resource it scheduled to the UE through the radio resource control (RRC) layer and/or through the physical layer on per data scheduling, per service type, per physical channel, per logical channel, per bandwidth part (BWP), per serving cell or per MAC entity's basis.

The physical channels include, but are not limited to, Physical Uplink Shared Channel (PUSCH), Physical Downlink Shared Channel (PDSCH), Physical Uplink Common Control Channel (PUCCH), and Physical Downlink Control Channel (PDCCH). The logical channels can be, but are not limited to, Broadcast Control Channel (BCCH), Paging Control Channel (PCCH), Common Control Channel (CCCH), Dedicated Control Channel (DCCH), and Dedicated Traffic Channel (DTCH). The bandwidth part (BWP) refers to the UE's operating bandwidth within the cell's operating bandwidth, which is indicated by the gNB. The UE's operating bandwidth is a subset of the total cell's operating bandwidth.

When only Carrier Aggregation (CA) is configured, and no Dual Connectivity (DC) is configured, the UE only has one RRC connection with the network. At RRC connection establishment, re-establishment, and handover, one serving cell provides the Non-access stratum (NAS) mobility information. The NAS is a set of protocols in the Evolved Packet System, and can be used to manage the establishment of communication sessions and for maintaining continuous communications with a UE as it moves. For example, the NAS can be used to convey non-radio signaling between the UE and the Mobility Management Entity (MME) for network access (e.g., an LTE/E-UTRAN access, 5G access, and the like). At RRC connection re-establishment and handover, one serving cell provides the security input. This serving cell is referred to as the Primary Cell (PCell). Depending on UE capabilities, Secondary Cells (SCells) can be configured to form, together with the PCell, a set of serving cells. The configured set of serving cells for a UE may therefore include one PCell and one or more SCells.

The MAC entity of the UE can handle transport channels, such as Broadcast Channel (BCH), Downlink Shared Channel(s) (DL-SCH), Paging Channel (PCH), Uplink Shared Channel(s) (UL-SCH), and Random Access Channel(s) (RACH). In Carrier Aggregation (CA), a single MAC entity may be configured to the UE and each of the aggregated serving cells (e.g., PCell, SCells, or the like) may be associated with the configured MAC entity for the UE. In Dual Connectivity, two MAC entities are configured to the UE: one for the Master Cell Group (MCG) and one for the Secondary Cell Group (SCG).

According to examples described herein, for grant-based URLLC data transmission, a gNB may apply new RRC parameter(s) for configuring a URLLC-specific RNTI, and may also extend the options of the existing RRC information element (IE) denoted MCS-table for indicating the MCS table for which the URLLC data transmission should apply. It is noted that, since the reliability requirement for URLLC and eMBB is different, the MCS table applied for the URLLC data transmission and for the eMBB data transmission may be different. Techniques are described herein for determining which MCS table to apply based on various factors.

When the UE simultaneously supports both of the eMBB and URLLC data transmissions, the gNB may indicate at least two independent MCS tables to the UE. An MCS table can include values summarizing the number of spatial streams, the modulation type, and the coding rate for a UE that is possible when connecting to the gNB. Based on the indication of at least two independent MCS tables, there can be one MCS table for the eMBB data transmission and another MCS table for the URLLC data transmission. A newly defined URLLC-specific RNTI and new MCS table are provided herein, and are referred herein to as U-RNTI (or MCS-C-RNTI) and U-MCS, respectively. The new U-MCS table is associated with a higher channel code rate (e.g., designed based on the BLER of 1e–5) than the existing MCS tables that can be used for other services, such as eMBB transmissions.

There are two existing options for the MCS table, including for example, 64QAM and 256QAM, which are designed based on the BLER of 1e–1. In order to achieve lower BLER for supporting URLLC service, the NR standard can extend the options of the MCS-table to introduce the new MCS table described herein (the U-MCS), which is designed based on a BLER of 1e–5. FIG. 3 is an example of an MCS table (e.g., the U-MCS) for high reliability transmissions (based on URLLC). FIG. 4 is an example of an MCS table for 64QAM for normal reliability transmission (e.g., designed based on a BLER of 1e–1, such as for eMBB or other service). FIG. 5 is an example of an MCS table for 256QAM for normal reliability transmission (e.g., designed based on a BLER of 1e−1, such as for eMBB or other service).

Two independent MCS table determination rules are described herein, which are designed for the UE to determine which of the MCS tables should be applied for each uplink grant and the downlink data scheduling. The MCS determination rules are illustrated in FIG. 6 and FIG. 7.

FIG. 6 shows a search-space-based (SS-based) MCS determination rule. A search space (or PDCCH search space) refers to the area in the downlink resource grid where a PDCCH may be carried. A UE can perform blind decoding throughout one or more search spaces trying to find PDCCH data (e.g., DCI). For example, in order for UE to decode PDCCH data (e.g., DCI), the UE has to figure out the exact value for location (e.g., CCE index), structure (e.g., Aggregation Level, Interleaving, and/or other structures), RNTI, and/or other information. In some cases, this information is not indicated to UE beforehand, and the values can change dynamically. Information (e.g., via a predefined rule or signaling message) is provided to the UE regarding a certain search range that possibly carries PDCCH data (e.g., DCI). Within the search range, the UE can try to decode PDCCH/DCI using different types of parameters (e.g., CCE Index, Aggregation Level, RNTI, etc.) on a trial and error basis. This type of decoding is referred to as blind decoding. The pre-defined region in which a UE perform the blind decoding is called a search space.

Two types of search spaces are provided, and are referred to as a UE-specific search space (USS) and a common search space (CSS). The USS is dedicated for each specific UE. The USS can be indicated to the UE via an RRC signaling message, in which case the UE will need to complete RRC establishment to obtain the information about the USS. The CSS is a specific search space that a UE needs to search for signals provided to every UE (e.g., PDCCH for system information block (SIB)) or signaling messages that are applied to every UE before a dedicated channel is established for a specific UE (e.g., PDCCH used during a random access channel (RACH) process).

Returning to FIG. 6, the SS-based MCS table determination rule can be based on the DCI format (e.g., 0_0, 1_0, 0_1, or 1_1) and the type of search space specified to the UE. For example, a UE can determine a DCI format associated with a DCI included in a downlink channel (e.g., PDCCH or other downlink channel). The UE can determine whether the search space associated with the downlink channel is the CSS or the USS. A certain MCS table is applied based on the DCI format and whether the search space is CSS or USS. For example, as shown in FIG. 6, for DCI formats 0_0 and 1_0 in CSS, the existing 64QAM MCS table (e.g., for normal reliability transmission, such as for eMBB) can be used, such as the MCS table shown in FIG. 4. In another example, as shown in FIG. 6, for DCI formats 0_0, 1_0, 0_1, and 1_1 in USS, the newly defined U-MCS table is used, such as the U-MCS table (sometimes referred to as a qam64LowSE) shown in FIG. 3.

FIG. 7 is an RNTI-based MCS table determination rule. As noted above, RNTIs may be used to differentiate and/or identify one specific radio channel from other radio channel and/or one UE from another UE (e.g., to differentiate UEs in a cell). The RNTI-based MCS table determination rule can be based on whether the DCI CRC is scrambled with the newly defined U-RNTI (sometimes referred to as a MCS-C-RNTI). For example, a UE can obtain information from a PDCCH, and can determine one or more CRC bits in the information are scrambled with the U-RNTI. The UE can apply a certain MCS table based on the determination. For example, as shown in FIG. 6, the RNTI-based MCS table determination rule indicates that, if the DCI CRC is scrambled with the U-RNTI (or MCS-C-RNTI), the U-MCS table is used (e.g., the U-MCS table shown in FIG. 3). Otherwise, the UE can follow existing NR behaviour (e.g., the UE can use the 64QAM MCS table, such as that shown in FIG. 4, or the 256QAM MCS table, such as that shown in FIG. 5. In some cases, whether the 64QAM MCS table or the 256QAM MCS table is applied by the UE, is configured by the gNB via an RRC layer.

The RNTI-based MCS table determination rule has shorter latency on the dynamic changing between scheduling radio resources with different MCS tables (e.g., level of the BLERs). Within each appearance of a PDCCH, a gNB may indicate the MCS table by scrambling the DCI with the C-RNTI or the U-RNTI (e.g., based on the RNTI-based MCS determination rule). This means that the UE may have the possibility of increasing the blind decoding overhead because the UE needs to descramble the DCI with the U-RNTI. The SS-based MCS table determination rule implicitly indicates the MCS table of the scheduled radio resource by which type of SS (USS for one MCS table and CSS for another MCS table) that the DCI is received on. Hence, the blind decoding overhead is not increased for the SS-based MCS table determination rule, but the scheduling flexibility is limited by the periodicity of the USS and CSS. Based on different scenarios, the gNB can configure the UE with different MCS table determination rules for different cell groups, BWPs, data channels, among others. Such configuration of the MCS determination rules means that it is possible that the gNB configures the U-RNTI to the UE on per UE, per cell group (e.g., per MAC entity), per BWP, per control channel (e.g., PDCCH), or per data channel (e.g., PDSCH or PUSCH). Depending on how the gNB makes the U-RNTI configuration, the UE MCS table determination rule for each cell group, BWP, control channel, or data channel may be different.

The UE may either apply the RNTI-based or SS-based MCS table determination rule for each of the uplink grant and the downlink data scheduling. The decision of which MCS table determination rule is to be applied by the UE can be based on whether the newly defined U-RNTI is configured for the UE, as illustrated by the flowchart shown in FIG. 8.

Figure 8:
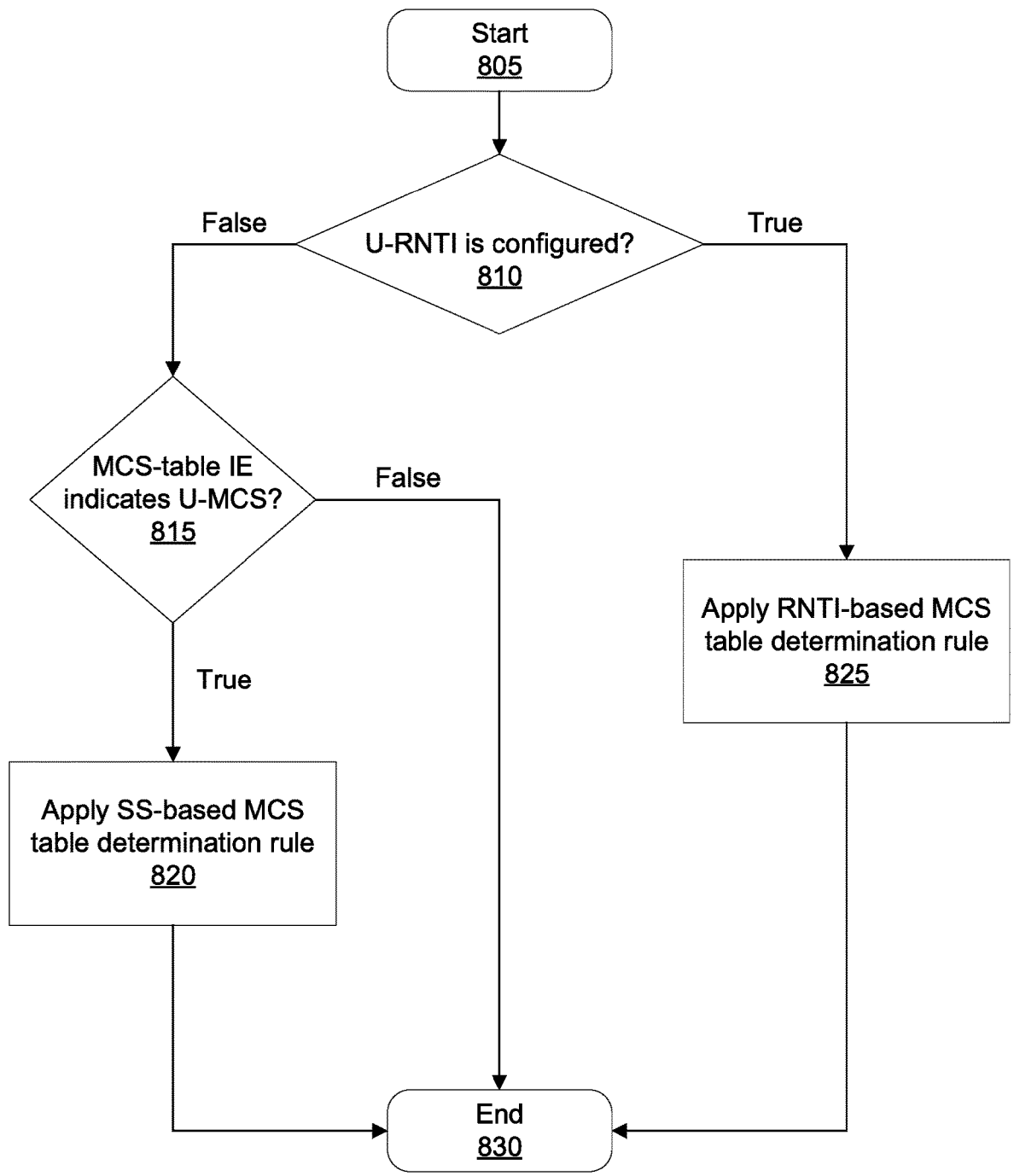
FIG. 8 is a flowchart illustrating a method for deciding which MCS table determination rule to apply, in accordance with some examples provided herein.

FIG. 8 is a flowchart illustrating a method of deciding which of the MCS table determination rules to apply. As shown in FIG. 8, whether the U-RNTI is configured by the gNB is one of the conditions for the UE to decide which of the MCS table determination rules should be applied. The method starts at step 805. At step 810, it is determined whether or not U-RNTI is configured. If U-RNTI is configured for the UE, the method continues at step 825 and the RNTI-based MCS table determination rule is applied. The method then ends at step 830. If the U-RNTI is not configured at step 810, the method continues at step 815 where it is determined whether MCS-table IE indicates U-MCS. If, at step 815, it is determined that the MCS-table IE indicates U-MCS (a "true" determination), the SS-based MCS table determination rule is applied at step 820. The method then ends at step 830. If it is determined at step 815 that the MCS-table IE does not indicate U-MCS (a "false" determination), the method ends at step 830. However, it is unclear how the gNB configures the U-RNTI to the UE, and how the U-RNTI is configured to the UE from the gNB on which kind of basis. Each of the configuration alternatives listed above results in a different level of UE blind decoding overhead and differing flexibility of the uplink grant and the downlink data scheduling.

Different techniques for configuration of the U-RNTI (or MCS-C-RNTI) are described. In one example, configuration of U-RNTI is configured per UE. For example, during the RRC configuration or RRC reconfiguration procedure, a gNB can configure the U-RNTI to the UE on a per UE perspective via specific downlink RRC message (e.g., RRCReconfiguration). Within the specific downlink RRC message, the gNB may indicate the value of the U-RNTI (e.g., U-RNTI-Value) to the UE by including a U-RNTI IE within the RRCReconfiguration message. An example of such an RRCReconfiguration message is shown in FIG. 9 as an example of a text proposal (TP). The "U-RNTI" IE (highlighted in FIG. 9 along with the corresponding U-RNTI-Value) is just an example. In some implementations, the U-RNTI IE can be contained in any other position of the RRCReconfiguration message.

Once the gNB configures the U-RNTI to the UE on the per-UE perspective, some or all of the uplink grant and the downlink data scheduling to the UE on some or all of the data channels, control channels, BWPs, and/or cell groups are considered to be assigned by the gNB to apply the RNTI-based MCS table determination rule.

In another example, the U-RNTI is configured per cell group (e.g., per MAC entity). For instance, a cell group-specific IE for configuring a master cell group (MCG) or a secondary cell group (SCG) can be used by a UE to determine the U-RNTI is configured for the UE. The cell group-specific IE can indicate a value of the U-RNTI. In such examples, the U-RNTI is configured for cells within the MCG or SCG based on the cell group-specific IE. The cell group-specific IE can include the CellGroupConfig information element, the MAC-CellGroupConfig information element, or the PhysicalCellGroupConfig information element.

For example, during the RRC configuration or RRC reconfiguration procedure, a gNB may configure the U-RNTI to the UE on a per cell group's perspective via a specific downlink RRC message (e.g., RRCReconfiguration). Within the specific downlink RRC message, the gNB may indicate the value of the U-RNTI (e.g., U-RNTI-Value) to the UE by containing a U-RNTI IE within the CellGroupConfig information element, the MAC-CellGroupConfig information element, or the PhysicalCellGroupConfig information element within the RRCReconfiguration message, as shown in FIG. 10, FIG. 11, and FIG. 12. The U-RNTI IE (highlighted along with the U-RNTI-value) within FIGS. 10, 11, and 12 are just examples. In some implementations, the U-RNTI IE can be contained in any other position (e.g., within any other IE) of the RRCReconfiguration message.

Once the gNB configures the U-RNTI to the UE on a per cell group's perspective, some or all of the uplink grant and the downlink data scheduling to the UE on some or all of the data channels, control channels, and/or BWPs within the configured cell group are considered to be assigned by the gNB to apply the RNTI-based MCS table determination rule. For example, the uplink grant and the downlink data scheduling on other cell groups received by the UE from the gNB are not considered to be assigned by the gNB to apply the RNTI-based MCS table determination rule.

In another example, the U-RNTI is configured per cell. For example, during the RRC configuration or RRC reconfiguration procedure, a gNB may configure the U-RNTI to the UE on a per cell's perspective via a specific downlink RRC message (e.g., RRCReconfiguration). Within the specific downlink RRC message, the gNB may indicate the value of the U-RNTI (e.g., U-RNTI-Value) to the UE by containing a U-RNTI IE within the ServingCellConfig information element or the ServingCellConfigCommon information, as shown in FIG. 13 and FIG. 14. The U-RNTI IE (highlighted along with the U-RNTI-value) shown in FIGS. 13 and 14 are just examples. In some implementations, the U-RNTI IE can also be contained in any other position (e.g., within any other IE) of the RRCReconfiguration message.

For same cell scheduling cases (i.e., scheduling cell and scheduled cell is the same cell), once the gNB configures the U-RNTI to the UE on a per cell's perspective, some or all of the uplink grant and the downlink data scheduling to the UE on some or all of the BWPs within the configured cell (i.e., cell which configured with the U-RNTI) are considered to be assigned by the gNB to apply the RNTI-based MCS table determination rule. The scheduling cell is the cell from which the UE receives the DCI, and the scheduled cell is the cell which is indicated by the received DCI. The uplink grant and the downlink data scheduling on other cells received by the UE from the gNB are not to be considered to be assigned by the gNB to apply the RNTI-based MCS table determination rule.

In some aspects, for cross cell scheduling (i.e., scheduling cell and scheduled cell are not the same cell), the introduced per cell U-RNTI configuration scheme can be either only limited to the scheduling cell or the scheduled cell. For example, if the U-RNTI configuration scheme may only be limited to the scheduling cell, the uplink grant and the downlink data scheduling indicated by the DCI which is received on the scheduling cell may be indicated to apply RNTI-based MCS table determination rule. However, if the U-RNTI configuration scheme is only limited to the scheduled cell, the uplink grant and the downlink data scheduling on the scheduled cell may be indicated to apply the RNTI-based MCS table determination rule In some cases, once the UE is also configured with the Cell corresponding supplemental uplink (SUL), the gNB may also indicate to the UE which of the MCS table determination rules should apply for the SUL by configuring the U-RNTI to the UE via specific downlink RRC message (e.g., RRCReconfiguration). Within the specific downlink RRC message, the gNB indicates the value of the U-RNTI (e.g., U-RNTI-Value) to the UE by including a U-RNTI IE within the ServingCellConfig information element, ServingCellConfigCommon information element, supplementaryUplinkConfig information element, UplinkConfigCommon information element, or ServingCellConfigCommon information element.

In another example, the U-RNTI is configured per bandwidth part (BWP). For example, during the RRC configuration or RRC reconfiguration procedure, a gNB can configure the U-RNTI to the UE on a per BWP's perspective via specific downlink RRC message (e.g., RRCReconfiguration). Within the specific downlink RRC message, the gNB indicates the value of the U-RNTI (e.g., U-RNTI-Value) to the UE by containing a U-RNTI IE within the BWP information element (i.e., one IE to configure BWP), as shown in FIG. 15, BWP-Uplink information element, BWP-UplinkDedicated information element, BWP-Downlink information element, or BWP-DownlinkDedicated information element within RRCReconfiguration message. The U-RNTI IE (highlighted along with the U-RNTI-value) within FIG. 15 is just an example. IN some implementations, the U-RNTI IE may be contained in any other position (e.g., within any other IE) of the RRCReconfiguration message.

For same BWP scheduling cases (i.e., scheduling BWP and scheduled BWP is the same BWP), once the gNB configures the U-RNTI to the UE on per BWP's perspective, some or all of the uplink grant and the downlink data scheduling to the UE on some or all of the data channels and control channels within the configured BWP may be considered to be assigned by the gNB to apply the RNTI-based MCS table determination rule. The scheduling BWP is the BWP from which the UE receives the DCI, and the scheduled BWP is the BWP that is indicated by the received DCI. The uplink grant and the downlink data scheduling on other BWPs received by the UE from the gNB are not to be considered to be assigned by the gNB to apply the RNTI-based MCS table determination rule.

In some aspects, for cross BWP scheduling (i.e., scheduling BWP and scheduled BWP are not the same BWP), the introduced per BWP U-RNTI configuration scheme can be either only limited to scheduling BWP or scheduled BWP. For example, if the U-RNTI configuration scheme is only limited to the scheduling BWP, the uplink grant and the downlink data scheduling indicated by the DCI which is received on the scheduling BWP may be indicated to apply the RNTI-based MCS table determination rule. However, if the U-RNTI configuration scheme is only limited to the scheduled BWP, the uplink grant and the downlink data scheduling on the scheduled BWP may be indicated to apply RNTI-based MCS table determination rule.

In another example, the U-RNTI is configured per control channel. For example, during the RRC configuration or RRC reconfiguration procedure, a gNB may configure the U-RNTI to the UE on a per control channel's perspective via specific downlink RRC message (e.g., RRCReconfiguration). Within the specific downlink RRC message, the gNB may indicate the value of the U-RNTI (e.g., U-RNTI-Value) to the UE by containing a U-RNTI IE within the PDCCH-ConfigCommon information element or the PDCCH-Config information element within an RRCReconfiguration message, as shown in FIG. 16 and FIG. 17. The U-RNTI IE (highlighted along with the U-RNTI-value) within FIGS. 16 and 17 are just examples. In some implementations, the U-RNTI IE can be contained in any other position (e.g., within any other IE) of the RRCReconfiguration message.

Once the gNB configures the U-RNTI to the UE on per control channel's perspective, some or all of the uplink grant and the downlink data scheduled to the UE by the gNB via the configured PDCCH may be considered to be assigned by the gNB to apply the RNTI-based MCS table determination rule. The uplink grant and the downlink data scheduled to the UE by the gNB via other PDCCH are not to be considered to be assigned by the gNB to apply the RNTI-based MCS table determination rule.

In another example, the U-RNTI is configured per downlink data channel. For example, during the RRC configuration or RRC reconfiguration procedure, a gNB may configure the U-RNTI to the UE on per downlink data channel's perspective via specific downlink RRC message (e.g., RRCReconfiguration). Within the specific downlink RRC message, the gNB may indicate the value of the U-RNTI (e.g., U-RNTI-Value) to the UE by containing a U-RNTI IE within the PDSCH-ConfigCommon information element or the PDSCH-Config information element within the RRCReconfiguration message, as shown in FIG. 18 and FIG. 19. The U-RNTI IE (highlighted along with the U-RNTI-value) in FIGS. 18 and 19 are just examples. In some implementations, the U-RNTI IE can also be included in any other position (e.g., within any other IE) of the RRCReconfiguration message.

Once the gNB configures the U-RNTI to the UE on a per downlink data channel's perspective, some or all of the downlink data scheduled to the UE by the gNB on the configured PDSCH may be considered to be assigned by the gNB to apply the RNTI-based MCS table determination rule. The downlink data scheduled to the UE by the gNB on other PDSCH may not be considered to be assigned by the gNB to apply the RNTI-based MCS table determination rule. The UE cannot predict when the gNB will schedule downlink data on the configured PDSCH and also cannot predict how the gNB will schedule the downlink data via which PDCCH because NR supports cross BWP and cross serving cell scheduling. This means that once any of one or more PDSCHs of the UE is configured with the U-RNTI, the UE will need to perform blind decoding for the U-RNTI in every PDCCH which has the possibility to perform the downlink data scheduling to the PDSCH.

In another example, the U-RNTI is configured per uplink data channel. For example, during the RRC configuration or RRC reconfiguration procedure, gNB may configure the U-RNTI to the UE on per uplink data channel's perspective via specific downlink RRC message (e.g., RRCReconfiguration). Within the specific downlink RRC message, the gNB may indicate the value of the U-RNTI (e.g., U-RNTI-Value) to the UE by containing a U-RNTI IE within the PUSCH-ConfigCommon information element or the PUSCH-Config information element within the RRCReconfiguration message, as shown in FIG. 20 and FIG. 21. The U-RNTI IE (highlighted along with the U-RNTI-value) within FIGS. 20 and 21 are just examples. In some implementations, the U-RNTI IE can also be contained in any other position (e.g., within any other IE) of the RRCReconfiguration message.

Once the gNB configures the U-RNTI to the UE on per uplink data channel's perspective, some or all of the uplink grant scheduled to the UE by the gNB on the configured PUSCH are considered to be assigned by the gNB to apply the RNTI-based MCS table determination rule. The uplink grant scheduled to the UE by the gNB on other PUSCH are not to be considered to be assigned by the gNB to apply the RNTI-based MCS table determination rule.

It is observed that UE cannot predict when the gNB will schedule uplink grant on the configured PUSCH and also cannot predict how gNB will schedule the uplink grant via which PDCCH because NR supports cross BWP and cross serving cell scheduling. This means that, once any of one or more PUSCHs of the UE is configured with the U-RNTI, the UE will need to perform blind decoding for the U-RNTI in every PDCCH which has the possibility to perform the uplink grant scheduling to the PUSCH.

In some implementations, a two-step U-RNTI (or MCS-C-RNTI) configuration can be performed. According to the design for the U-RNTI configuration introduced above, whether the gNB includes the U-RNTI IE (U-RNTI-Value) in the corresponding IE or RRC message is representative as an indication of whether the UE should apply the RNTI-based MCS table determination rule or not. However, in some cases, the gNB may need to indicate the U-RNTI value to the UE cell by cell, BWP by BWP, or channel by channel, which can waste radio resources. In order to make the overall configuration procedure more efficient, a two-step U-RNTI configuration scheme may be implemented which can significantly reduce the repetition of including the U-RNTI IE into multiple of IEs (e.g., CellGroupConfig, ServingCellConfig, BWP, PDCCH-Config, PDSCH-Config, or PUSCH-Config IE) for each of the cell groups, cells, BWPs, control channels, or data channels. In the two-step U-RNTI configuration scheme, the configuration of the U-RNTI from the gNB to the UE may be divided into two parts (i.e., U-RNTI-I and U-RNTI-II), which are either included in the same or different downlink RRC messages/IEs.

The U-RNTI-I indicates the U-RNTI-Value which is shared between the configured cell groups, cells, BWPs, control channels, or data channels within the UE. The U-RNTI-II may indicate whether the U-RNTI-I (e.g., U-RNTI-Value) should be applied for PDCCH blind decoding for corresponding cell group, cell, BWP, control channel, or data channel. In some implementations, the U-RNTI-II may be a Boolean parameter: 1 is for True and 0 is for False in some examples. The UE may apply the U-RNTI-I when the U-RNTI-II Boolean parameter is set to TRUE, otherwise the UE may ignore the U-RNTI-I when the Boolean parameter is set to False. In some aspects, the UE may apply the U-RNTI-I when the U-RNTI-II exists, otherwise the UE ignores the U-RNTI-I when the U-RNTI-II is absent.

In some examples, an individual indication of whether the U-RNTI should be applied can be used. For instance, for each of the different RNTI configuration techniques introduced above, the U-RNTI-I and U-RNTI-II IEs can be included in different IEs accordingly. Examples will now be described describing how U-RNTI-I and U-RNTI-II IEs may be placed.

Using the configuration of U-RNTI which is per cell group as an example, when all of the cell groups (e.g., MCG, SCG, or the like) configured to the UE share a single U-RNTI value, the U-RNTI-I IE can be, but is not limited to being, included in an RRCReconfiguration message or CellGroupConfig information element (or other cell group-specific IE), but the U-RNTI-II IE can individually be contained in each of the CellGroupConfig information element, the MAC-CellGroupConfig information element, or the PhysicalCellGroupConfig information element if the CellGroupConfig, MAC-CellGroupConfig, or PhysicalCellGroupConfig corresponding cell group needs to be indicated to apply RNTI-based MCS determination rule. For example, if the CellGroupConfig, MAC-CellGroupConfig, or PhysicalCellGroupConfig corresponding Cell group was not indicated with U-RNTI-II, or U-RNTI-II is set to False, the UE will not apply RNTI-based MCS table determination rule for the cell group.

Using the configuration of U-RNTI which is per cell as an example, when all of the cells configured to the UE share a single U-RNTI value, the U-RNTI-I IE can be, but is not limited to being, included in an RRCReconfiguration message or a CellGroupConfig IE, but the U-RNTI-II IE can be individually included in each configured cell's corresponding ServingCellConfig or ServingCellConfigCommon IE if the Cell needs to be indicated to apply RNTI-based MCS determination rule. For example, if the ServingCellConfig or ServingCellConfigCommon corresponding Cell was not indicated with U-RNTI-II, or U-RNTI-II is set to False, the UE will not apply RNTI-based MCS table determination rule for the cell.

Using the configuration of U-RNTI which is per BWP as an example, when all of the BWPs configured to the UE share a single U-RNTI value, the U-RNTI-I IE can be, but is not limited to being, included in an RRCReconfiguration message, in a CellGroupConfig IE, in a ServingCellConfig IE, or in a ServingCellConfigCommon IE, but the U-RNTI-II IE can be individually included in each configured BWP's corresponding BWP, BWP-Uplink, BWP-UplinkDedicated, BWP-Downlink, or BWP-DownlinkDedicated IE if the BWP needs to be indicated to apply RNTI-based MCS determination rule. For example, if the BWP, BWP-Uplink, BWP-UplinkDedicated, BWP-Downlink, or BWP-DownlinkDedicated corresponding BWP was not indicated with U-RNTI-II, or U-RNTI-II is set to False, the UE will not apply RNTI-based MCS table determination rule for the BWP.

Using the configuration of U-RNTI which is per control channel as an example, when all of the control channels configured to the UE share a single U-RNTI value, the U-RNTI-I IE can be, but is not limited to being, included in an RRCReconfiguration message, a CellGroupConfig IE, ServingCellConfig IE, a ServingCellConfigCommon IE, a BWP IE, a BWP-Downlink IE, or a BWP-DownlinkDedicated IE, but the U-RNTI-II IE can be individually included in each configured control channel's corresponding PDCCH-ConfigCommon or PDCCH-Config IE if the control channel needs to be indicated to apply RNTI-based MCS determination rule. For example, if the PDCCH-ConfigCommon or PDCCH-Config corresponding control channel was not indicated with U-RNTI-II, or U-RNTI-II is set to False, the UE will not apply RNTI-based MCS table determination rule for the downlink control channel.

Using the configuration of U-RNTI which is per downlink data channel as an example, when all of the downlink data channels configured to the UE share a single U-RNTI value, the U-RNTI-I IE can be, but is not limited to being, included in an RRCReconfiguration message, in a CellGroupConfig IE, in a ServingCellConfig IE, in a ServingCellConfigCommon IE, in a BWP IE, in a BWP-Downlink IE, or in a BWP-DownlinkDedicated IE, but the U-RNTI-II IE may be individually included in each configured control channel's corresponding PDSCH-ConfigCommon or PDSCH-Config IE if the downlink data channel needs to be indicated to apply RNTI-based MCS determination rule. For example, if the PDSCH-ConfigCommon or PDSCH-Config corresponding control was not indicated with U-RNTI-II, or U-RNTI-II is set to False, the UE will not apply RNTI-based MCS table determination rule for the downlink data channel.

FIG. 22 and FIG. 23 show possible configuration text proposals (TP). FIG. 22 is an example of a TP showing a per cell group configured U-RNTI-I IE. The U-RNTI-I shown in FIG. 22 indicates the U-RNTI-Value, which is shared between the configured cell groups, cells, BWPs, control channels, or data channels within the UE. FIG. 23 is an example of a TP showing a per downlink data channel configured U-RNTI-II IE. The U-RNTI-II shown in FIG. 23 indicates whether the U-RNTI-I (i.e., the U-RNTI-Value) should be applied for PDCCH blind decoding for a corresponding cell group, cell, BWP, control channel, or data channel Some or all of the aspects described above for individually indicating whether the U-RNTI should be applied can logically apply similar settings of U-RNTI-I and U-RNTI-II to corresponding IEs.

Using the configuration of U-RNTI which is per uplink data channel as an example, when all of the uplink data channels configured to the UE share a single U-RNTI value, the U-RNTI-I IE can be, but is not limited to being, included in an RRCReconfiguration message, in a CellGroupConfig IE, in a ServingCellConfig IE, in a ServingCellConfigCommon IE, in a BWP IE, in a BWP-Uplink IE, or in a BWP-UplinkDedicated IE, but the U-RNTI-II IE may individually be included in each configured control channel's corresponding PUSCH-ConfigCommon or PUSCH-Config IE if the uplink data channel needs to be indicated to apply RNTI-based MCS determination rule. For example, if the PUSCH-ConfigCommon or PUSCH-Config corresponding control was not indicated with U-RNTI-II, or U-RNTI-II is set to False, the UE will not apply RNTI-based MCS table determination rule for the uplink data channel.

In some implementations, the U-RNTI-II may also be included in a configured grant configuration IE (e.g., the ConfiguredGrantConfig as shown in FIG. 24), while the U-RNTI-I IE can be, but is not limited to being, included in an RRCReconfiguration message, in a CellGroupConfig IE, in a ServingCellConfig IE, in a ServingCellConfigCommon IE, in a BWP IE, in a BWP-Uplink IE, in a BWP-UplinkDedicated IE, in a BWP-Downlink IE, or in a BWP-DownlinkDedicated IE. It is noted that the configured grant may be configured by RRC per serving cell and/or per BWP.

BLER and MCS configuration will now be described. A BLER level-specific RNTI is introduced herein. For example, NR can introduce the U-RNTI for the purpose of indicating whether the UE should apply a 1e–5 BLER MCS table for URLLC service. However, NR may introduce more options of the MCS table that have lower target BLER which bundles with different modulation coding schemes. Hence, a more aggressive MCS table indication method may be determined from the gNB to the UE. For example, gNB may provide a list of U-RNTI-Value within the U-RNTI-I. This means that the U-RNTI-I IE can be a list of values of the U-RNTI (e.g., U-RNTI-Value {Value_1, Value_2, Value_3, Value_4}). Each of the values within the list of values of the U-RNTI may refer to a different purpose (e.g., implicitly indicating the different target BLER level of an MCS table). A third type of the U-RNTI (i.e., U-RNTI-III) may indicate which value within the U-RNTI-I should be applied for the UE. For example, if the U-RNTI-III is a two-bit stream, then 00 means the UE should apply Value 1, 01 means the UE should apply Value 2, 10 means the UE should apply Value 3, and 11 means the UE should apply Value 4. It is noted that each of the values within the U-RNTI-Value refers to a corresponding MCS table. Value 1 may refer to corresponding MCS table 1, Value 2 to corresponding MCS table 2, Value 3 to corresponding MCS table 3, and Value 4 to corresponding MCS table 4. The four MCS tables may be different in target BLER level, or in modulation coding level (maximum modulation coding ratio).

In some aspects, if the UE is indicated by the gNB to apply the SS-based MCS determination rule, the gNB can also apply a first-IE to indicate a list of MCS tables, and apply a second-IE to indicate which of the MCS tables within the first-IE should be applied for a corresponding search space. Both of the CSS and USS can be indicated with a single second-IE which can mean the MCS table applied by CSS and USS are the same. Alternatively, the CSS and USS can be indicated with two different second-IEs, in which case the MCS table applied by CSS and USS are the same or are different.

It is noted that the U-RNTI-III can be, but is not limited to being, placed together with the U-RNTI-II. Alternatively, the gNB can place the U-RNTI-III in some other corresponding IE/RRC message.

BLER and MCS are two independent factors. If the NR wants to support more diverse service, it may introduce more options of MCS (e.g., 64QAM, 256QAM or 1024QAM) and BLER (e.g., 1e–1, 1e–5, 1e–7 or 1e–9). A possible MCS and BLER_indication example is that, while the gNB is indicating the MCS-table (e.g., currently a NR IE) to the UE, the gNB can independently indicate the BLER of the MCS-table via another independent IE (e.g., BLER_indication). Hence, the UE can decide the MCS table by referring to both of the MCS-table and the new BLER_indication IE. Alternatively, the gNB can introduce a BLER level specific U-RNTI, where the gNB pre-configures the MCS for each of the BLER level specific U-RNTI. Hence, the UE can be implicitly indicated the MCS table to use by only a BLER level specific U-RNTI.

In some aspects, the gNB may apply another independent MSC-table IE for another specific BLER level. For example, a MCS-table: {64QAM or 256QAM} for 1e–1 BLER (e.g., MCS-table_eMBB IE), a MCS-table: {64QAM or 256QAM} (e.g., MCS-table_URLLC IE) for 1e–5 BLER and a MCS-table: {64QAM or 256QAM} for 1e–7 BLER (e.g., MCS-table_SomeOtherService IE).

In some aspects, the gNB may extend the range/option within the current MCS-table IE. Before configuring the MCS-table to the UE, gNB may pre-notify the UE on each of the options within the MCS-table representing which kind of BLER and MCS.

It is noted that both of the RNTI-based MCS determination rule and the SS-based MCS determination rule are just examples. In some cases, other MCS table determination rules can also be applied. For example, the design for how to decide the MCS determination rule can also be logically adopted and/or extended to some other MCS determination rules.

In some aspects, if one of the cell groups configured to the UE is serving from another gNB or eNB (e.g., secondary node) while a cell group is served from master gNB or eNB, the U-RNTI-I and/or U-RNTI-II and/or U-RNTI-III IEs may be transmitted from the master gNB to the secondary node, or vice versa. The secondary node may either configure those configuration information elements introduced herein to the UE directly, or configure those configuration information elements according to the corresponding configuration receiving from the master gNB or eNB, and vice versa.

In some aspects, the U-RNTI-I is always contained in the RRCReconfiguration message, but the U-RNTI-II is a Boolean parameter. A UE may apply the U-RNTI-I when the Boolean parameter is set to TRUE, otherwise the UE may ignore the U-RNTI-I when the Boolean parameter is set to False.

Figure 25:
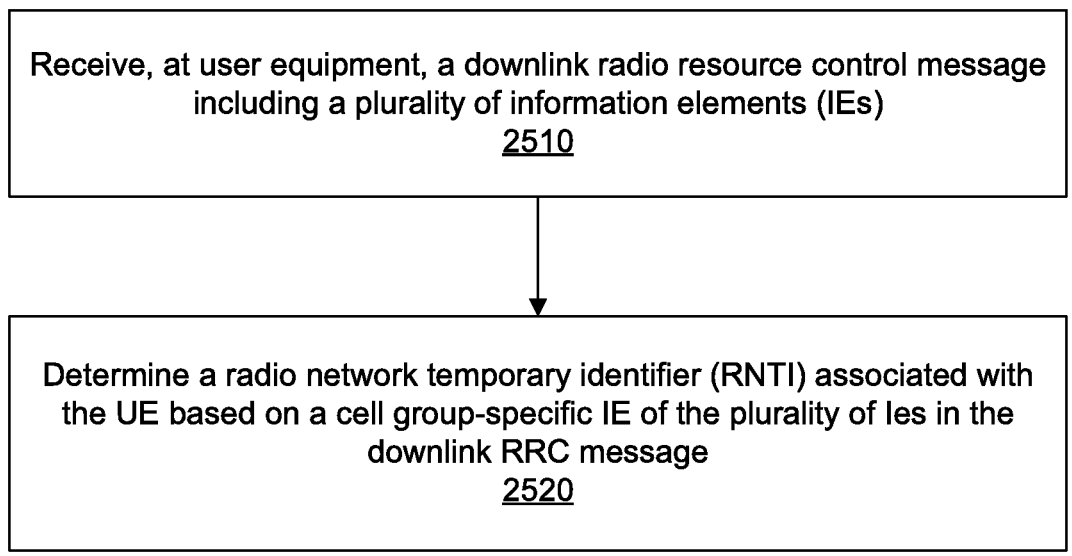
FIG. 25 is a flowchart illustrating an example of a method for performing U-RNTI based configuration per cell group, in accordance with some examples provided herein.

FIG. 25 is a flowchart illustrating an example of a method for performing U-RNTI based configuration per cell group, in accordance with some examples provided herein. At step 2510, a downlink radio resource control (RRC) message is received at user equipment (UE). The RRC message includes a plurality of information elements (IEs). The downlink RRC message is used to configure RRC for the UE.

At step 2520, the method determines a radio network temporary identifier (RNTI) that is associated with the UE based on a cell group-specific IE of the plurality of IEs in the downlink RRC message. The cell group-specific IE is used to configure a maser cell group (MCG) or a secondary cell group (SCG). The RNTI is configured for cells within the MCG or SCG based on the cell group-specific IE. The cell group-specific IE can include the CellGroupConfig information element, the MAC-CellGroupConfig information element, or the PhysicalCellGroupConfig information element. In some aspects, configuration parameters for the MCG or SCG are provided in the cell group-specific IE.

In some aspects, the RNTI is a Modulation Coding Scheme Cell-RNTI (MCS-C-RNTI), or a U-RNTI. In some aspects, the method further comprises receiving uplink grant and downlink data scheduling for the UE on one or more physical shared channels of the MCG or SCG. In some aspects, an RNTI-based MCS table determination rule is applied to the uplink grant and downlink data scheduling in response to the MCS-C-RNTI being configured via the cell group-specific IE, as described above. In some examples, applying the RNTI-based MCS determination rule includes obtaining information from a physical downlink control channel (PDCCH), determining one or more cyclic redundancy check (CRC) bits in the information are scrambled with the RNTI, and applying a first modulation coding scheme (MCS) table based on the determination. In some aspects, the information obtained from the PDCCH includes downlink control information (DCI). The DCI includes the one or more CRC bits scrambled with the RNTI. In some aspects, the first MCS table is associated with a higher channel code rate than a second MCS table.

Figure 26:
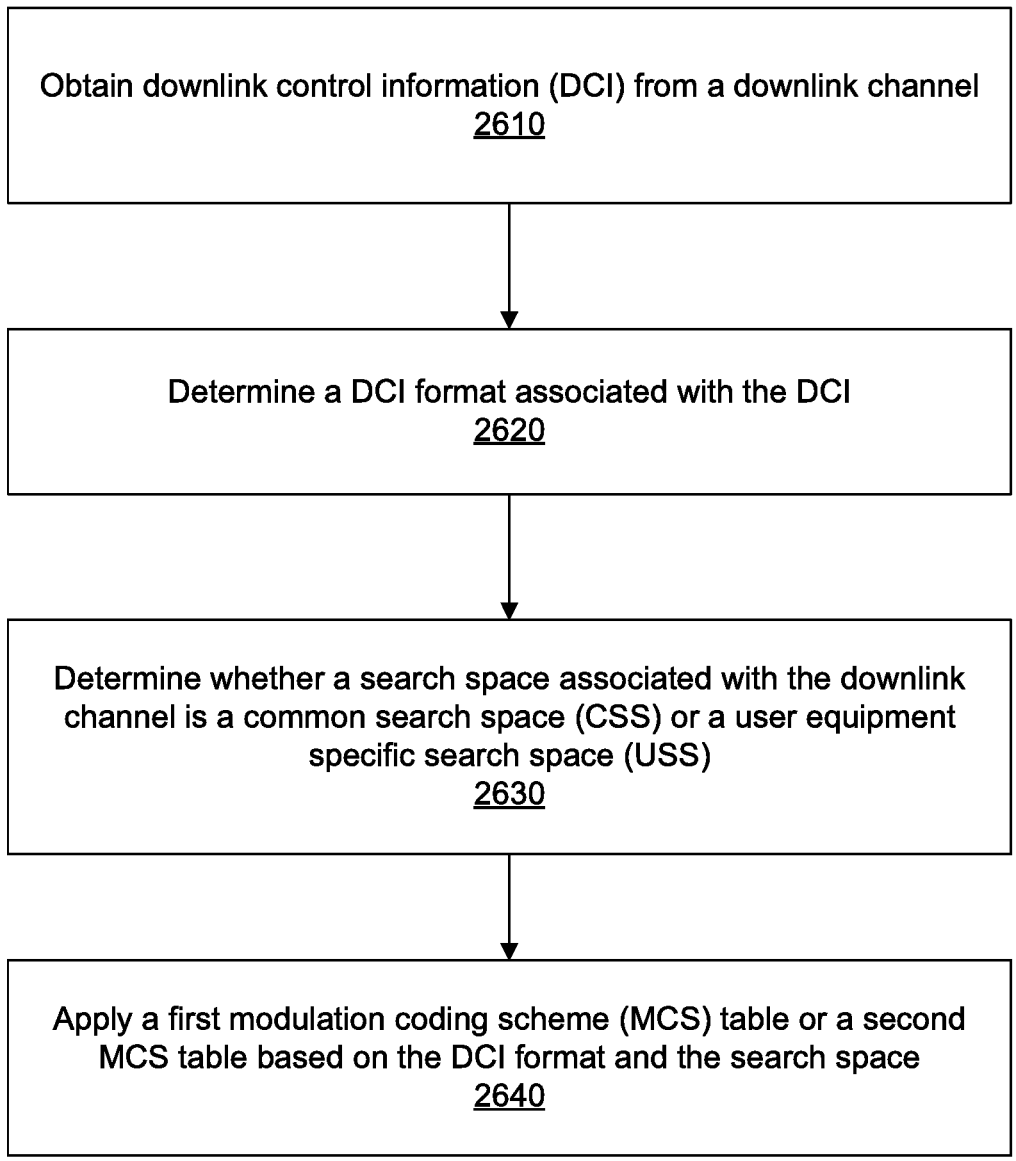
FIG. 26 is a flowchart illustrating an example of a method for applying the search space-based MCS table determination rule, in accordance with some examples provided herein.

FIG. 26 is a flowchart illustrating a method for applying the search space-based MCS table determination rule, in accordance with some examples provided herein. At step 2610, downlink control information (DCI) is obtained from a downlink channel. At step 2620, a DCI format associated with the DCI is determined. At step 2630, it is determined whether a search space associated with the downlink channel is a common search space (CSS) or a user equipment specific search space (USS). At step 2640, a first modulation coding scheme (MCS) table is applied or a second MCS table is applied based on the DCI format and the search space. For example, the first MCS table or the second MCS table can be applied for uplink grant and downlink data scheduling.

In some aspects, the DCI format is 0_0 DCI format or a 1_0 DCI format, the search space is the CSS, and the first MCS table is applied based on the search space being the CSS and the DCI format being the 0_0 DCI format or the 1_0 DCI format. In some aspects, the first MCS table is a 64 quadrature amplitude modulation (64QAM) MCS table, such as that shown in FIG. 4. In some aspects, the first MCS table is a 256 quadrature amplitude modulation (256QAM) MCS table, such as that shown in FIG. 5.

In some aspects, the DCI format is a 0_0 DCI format, a 1_0 DCI format, a 0_1 DCI format, or a 1_1 DCI format, the search space is the USS, and the second MCS table is applied based on the search space being the USS and the DCI format being the 0_0 DCI format, the 1_0 DCI format, the 0_1 DCI format, or the 1_1 DCI format. In some aspects, the second MCS table is associated with a higher channel code rate than the first MCS table and/or is designed for a BLER of $10^{-5}$. In some aspects, the second MCS table is an Ultra-reliable and Low Latency Communications (URLLC)-MCS table, such as that shown in FIG. 3.

Figure 27:
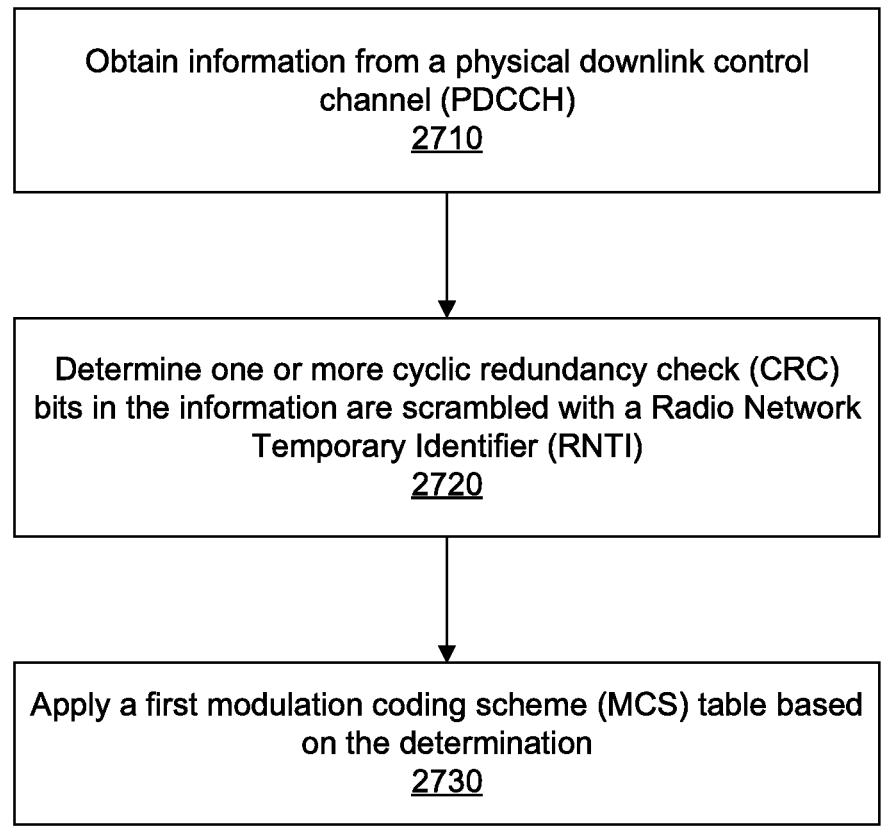
FIG. 27 is a flowchart illustrating an example of a method for applying the RNTI-based MCS table determination rule, in accordance with some examples provided herein.

FIG. 27 is a flowchart illustrating a method for applying the RNTI-based MCS table determination rule, in accordance with some examples provided herein. At step 2710, information is obtained from a physical downlink control channel (PDCCH). At step 2720, one or more cyclic redundancy check (CRC) bits in the information are determined to be scrambled with a Radio Network Temporary Identifier (RNTI). At step 2730, a first modulation coding scheme (MCS) table is applied based on the determination that the one or more CRC bits in the information are scrambled with the RNTI.

In some examples, the information obtained from the PDCCH includes downlink control information (DCI). The DCI includes the one or more CRC bits scrambled with the RNTI. In some aspects, the method further comprises descrambling the DCI with the RNTI.

In some examples, the first MCS table is associated with a higher channel code rate than a second MCS table and/or is designed for a BLER of $10^{-5}$. In some aspects, the first MCS table is a Ultra-Reliable and Low Latency Communications (URLLC)-MCS (U-MCS) table, such as that shown in FIG. 3.

In some examples, the method further comprises determining one or more CRC bits in information of an additional PDCCH are not scrambled with the RNTI, and applying a second MCS table based on the determination. In some aspects, the first MCS table is associated with a higher channel code rate than the second MCS table, and can include a U-MCS table, such as that shown in FIG. 3.

Figure 28:
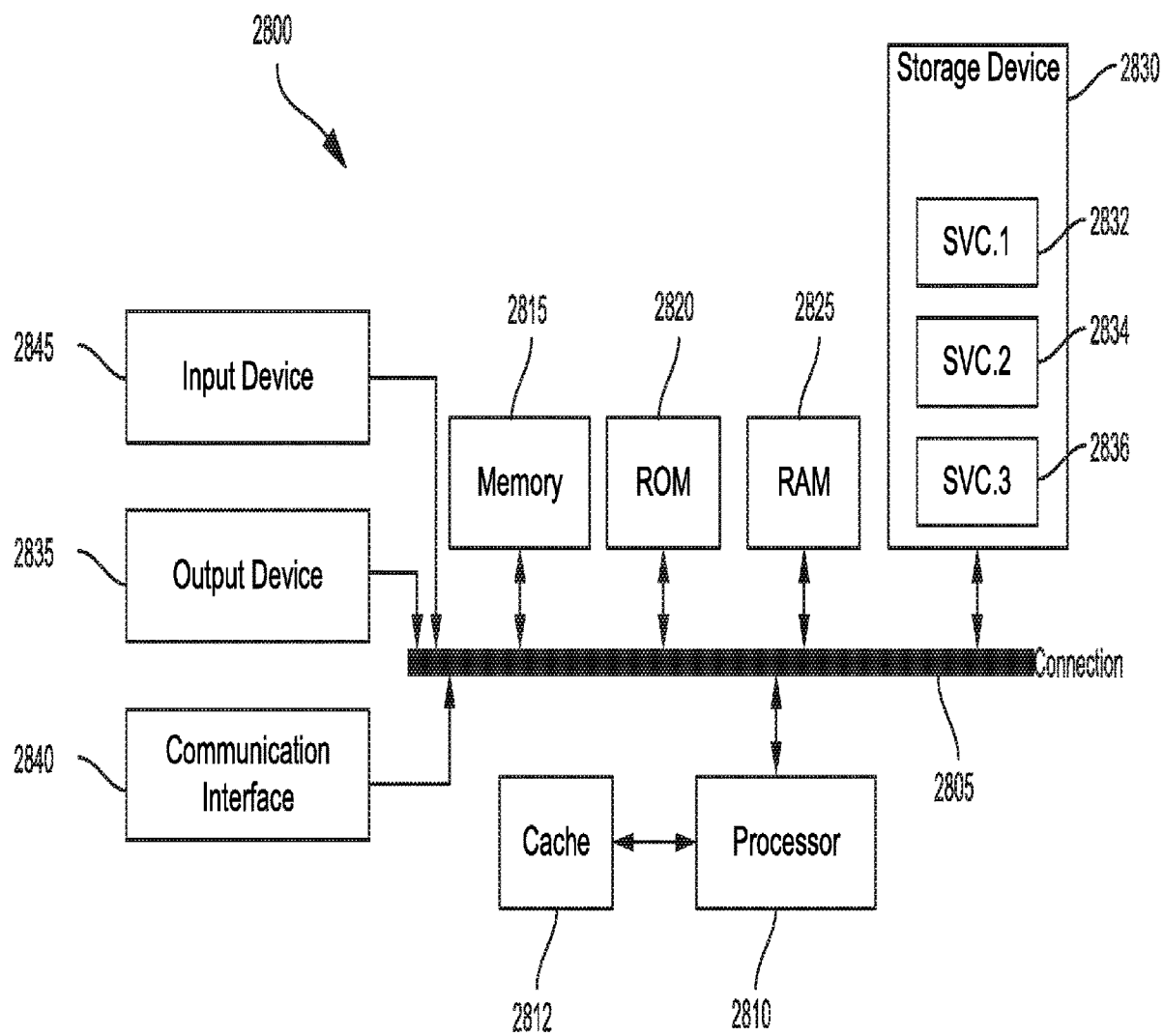
FIG. 28 is an example computing device architecture of an example computing device that can implement the various techniques described herein.

In some examples, the methods 2500, 2600, and 2700 may be performed by a computing device or apparatus, such as a computing device having the computing device architecture 2800 shown in FIG. 28. The computing device can include a UE or other suitable device. In some cases, the computing device or apparatus may include an input device, an output device, one or more processors, one or more microprocessors, one or more microcomputers, or other component that is configured to carry out the steps of methods 2500, 2600, and 2700. The components of the computing device (e.g., the one or more processors, one or more microprocessors, one or more microcomputers, and/or other component) can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein. The computing device may further include a display, a network interface configured to communicate and/or receive the data, any combination thereof, and/or other component(s). The network interface may be configured to communicate and/or receive telecommunications based data or other type of data.

Methods 2500, 2600, and 2700 are illustrated as logical flow diagrams, the operation of which represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the methods 2500, 2600, and 2700 may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

FIG. 28 illustrates an example computing device architecture 2800 of an example computing device which can implement the various techniques described herein. The components of computing device architecture 2800 are shown in electrical communication with each other using connection 2805, such as a bus. The example computing device architecture 2800 includes a processing unit (CPU or processor) 2810 and computing device connection 2805 that couples various computing device components including computing device memory 2815, such as read only memory (ROM) 2820 and random access memory (RAM) 2825, to processor 2810.

Computing device architecture 2800 can include a cache of high-speed memory connected directly with, in close proximity to, or integrated as part of processor 2810. Computing device architecture 2800 can copy data from memory 2815 and/or the storage device 2830 to cache 2812 for quick access by processor 2810. In this way, the cache can provide a performance boost that avoids processor 2810 delays while waiting for data. These and other modules can control or be configured to control processor 2810 to perform various actions. Other computing device memory 2815 may be available for use as well. Memory 2815 can include multiple different types of memory with different performance characteristics. Processor 2810 can include any general purpose processor and a hardware or software service, such as service 1 2832, service 2 2834, and service 3 2836 stored in storage device 2830, configured to control processor 2810 as well as a special-purpose processor where software instructions are incorporated into the processor design. Processor 2810 may be a self-contained system, containing multiple cores or processors, a bus, memory controller, cache, etc. A multi-core processor may be symmetric or asymmetric.

To enable user interaction with the computing device architecture 2800, input device 2845 can represent any number of input mechanisms, such as a microphone for speech, a touch-sensitive screen for gesture or graphical input, keyboard, mouse, motion input, speech and so forth. Output device 2835 can also be one or more of a number of output mechanisms known to those of skill in the art, such as a display, projector, television, speaker device, etc. In some instances, multimodal computing devices can enable a user to provide multiple types of input to communicate with computing device architecture 2800. Communications interface 2840 can generally govern and manage the user input and computing device output. There is no restriction on operating on any particular hardware arrangement and therefore the basic features here may easily be substituted for improved hardware or firmware arrangements as they are developed.

Storage device 2830 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 2825, read only memory (ROM) 2820, and hybrids thereof. Storage device 2830 can include services 2832, 2834, 2836 for controlling processor 2810. Other hardware or software modules are contemplated. Storage device 2830 can be connected to the computing device connection 2805. In one aspect, a hardware module that performs a particular function can include the software component stored in a computer-readable medium in connection with the necessary hardware components, such as processor 2810, connection 2805, output device 2835, and so forth, to carry out the function.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the embodiments and examples provided herein. However, it will be understood by one of ordinary skill in the art that the embodiments may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set indicates that one member of the set or multiple members of the set satisfy the claim. For example, claim language reciting "at least one of A and B" means A, B, or A and B.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

What is claimed is:

1. A method, comprising:
receiving a downlink radio resource control (RRC) message, the RRC message including an information element (IE);
using the IE to configure a cell group and a radio network temporary identifier (RNTI), the RNTI being configured for one or more cells within the cell group;
receiving information from a physical downlink control channel (PDCCH), the information including downlink control information (DCI), wherein the DCI includes a set of cyclic redundancy check (CRC) bits that are scrambled with the RNTI, and indicates an uplink grant for the one or more cells within the cell group;
applying a modulation coding scheme (MCS) table to the uplink grant as a result of the RNTI being configured using the IE;
receiving a downlink data scheduling for the one or more cells within the cell group; and
applying an RNTI-based MCS determination rule to the downlink data scheduling as a result of the RNTI being configured using the IE.

2. The method of claim 1, further comprising:
receiving second information from the PDCCH,
wherein the second information includes a second DCI,
the second DCI includes another set of CRC bits that are not scrambled with the RNTI, and
the second DCI includes a second uplink grant.

3. The method of claim 2, further comprising applying another MCS table to the second uplink grant.

4. The method of claim 1, wherein the RNTI is a Modulation Coding Scheme Cell-RNTI (MCS-C-RNTI).

5. An electronic device, comprising:
one or more processors; and
one or more non-transitory computer-readable media storing one or more instructions that, when executed by at least one of the one or more processors, cause the electronic device to:
receive a downlink radio resource control (RRC) message, the RRC message including an information element (IE);
use the IE to configure a cell group and a radio network temporary identifier (RNTI), the RNTI being configured for one or more cells within the cell group;
receive information from a physical downlink control channel (PDCCH), the information including downlink control information (DCI), wherein the DCI includes a set of cyclic redundancy check (CRC) bits that are scrambled with the RNTI, and indicates an uplink grant for the one or more cells within the cell group;
apply a modulation coding scheme (MCS) table to the uplink grant as a result of the RNTI being configured using the IE;
receive a downlink data scheduling for the one or more cells within the cell group; and
apply an RNTI-based MCS determination rule to the downlink data scheduling as a result of the RNTI being configured using the IE.

6. The system of claim 5, wherein the one or more instructions, when executed by the at least one of the one or more processors, further cause the electronic device to:
receive second information from the PDCCH,
wherein the second information includes a second DCI,
the second DCI includes another set of CRC bits that are not scrambled with the RNTI, and
the second DCI includes a second uplink grant.

7. The system of claim 6, wherein the instructions further cause the system to apply another MCS table to the second uplink grant.

8. The system of claim 5, wherein the RNTI is a Modulation Coding Scheme Cell-RNTI (MCS-C-RNTI).

9. A non-transitory computer-readable medium storing one or more instructions that, when executed by one or more processors of a device, cause the device to:
receive a downlink radio resource control (RRC) message, the RRC message including an information element (IE);
use the IE to configure a cell group and a radio network temporary identifier (RNTI), the RNTI being configured for one or more cells within the cell group;
receive information from a physical downlink control channel (PDCCH), information including downlink control information (DCI), wherein the DCI includes a set of cyclic redundancy check (CRC) bits that are scrambled with the RNTI, and indicates an uplink grant for the one or more cells within the cell group;
apply a modulation coding scheme (MCS) table to the uplink grant as a result of the RNTI being configured using the IE;
receive a downlink data scheduling for the one or more cells within the cell group; and
apply an RNTI-based MCS determination rule to the downlink data scheduling as a result of the RNTI being configured using the IE.

10. The non-transitory computer-readable medium of claim 9, wherein the one or more instructions, when executed by the one or more processors of the device, further cause the device to:
receive second information from the PDCCH,
wherein the second information includes a second DCI,
the second DCI includes another set of CRC bits that are not scrambled with the RNTI, and
the second DCI includes a second uplink grant.

11. The non-transitory computer-readable medium of claim 10, wherein the executable instructions further cause the computer system to apply another MCS table to the second uplink grant.

12. The non-transitory computer-readable medium of claim 9, wherein the RNTI is a Modulation Coding Scheme Cell-RNTI (MCS-C-RNTI).

* * * * *